US011517812B2

(12) United States Patent
Lee et al.

(10) Patent No.: US 11,517,812 B2
(45) Date of Patent: Dec. 6, 2022

(54) APPLICATION OF RFID GAMEPIECES FOR A GAMING CONSOLE

(71) Applicant: Blok Party, Inc., South San Francisco, CA (US)

(72) Inventors: Kwok Shing Lee, San Mateo, CA (US); Joseph Scott, Palo Alto, CA (US)

(73) Assignee: Blok Party, Inc., San Carlos, CA (US)

( * ) Notice: Subject to any disclaimer, the term of this patent is extended or adjusted under 35 U.S.C. 154(b) by 0 days.

(21) Appl. No.: 17/180,603

(22) Filed: Feb. 19, 2021

(65) Prior Publication Data
US 2022/0266129 A1    Aug. 25, 2022

(51) Int. Cl.
*A63F 13/2145*    (2014.01)
*G06Q 20/12*    (2012.01)
*A63F 13/55*    (2014.01)
*A63F 13/235*    (2014.01)

(52) U.S. Cl.
CPC ........ *A63F 13/2145* (2014.09); *A63F 13/235* (2014.09); *A63F 13/55* (2014.09); *G06Q 20/1235* (2013.01)

(58) Field of Classification Search
CPC .... A63F 13/2145; A63F 13/235; A63F 13/55; A63F 2003/00662; G06Q 20/1235
See application file for complete search history.

(56) References Cited

U.S. PATENT DOCUMENTS

| 5,618,045 A | 4/1997 | Kagan et al. |
| 5,702,305 A | 12/1997 | Norman et al. |
| 5,731,788 A | 3/1998 | Reeds |
| 6,080,063 A | 6/2000 | Khosla |
| 6,287,200 B1 | 9/2001 | Sharma |
| 6,320,495 B1 | 11/2001 | Sporgis |
| 6,500,070 B1 | 12/2002 | Tomizawa et al. |
| 6,524,189 B1 | 2/2003 | Rautila |

(Continued)

OTHER PUBLICATIONS

Website, Collectible Vinyl Toys Powered by the Ethereum Blockchain, CryptoKaiju, Accessed on Oct. 16, 2020, https://cryptokaiju.io/.

(Continued)

*Primary Examiner* — Thomas J Hong
*Assistant Examiner* — Carl V Larsen
(74) *Attorney, Agent, or Firm* — MLO, a professional corp.

(57) ABSTRACT

Disclosed embodiments relate to the application of radiofrequency (RFID) gamepieces for a gaming console. In one example, a gaming console includes a processor, a touchscreen to detect RFID gamepieces placed thereon and overlaying an RFID reader; each gamepiece having a base containing an RFID tag, which can be supported by central, peripheral or offset supports usable to detect its position and orientation and tall enough to support the base above a touchscreen detection zone, the RFID tag disposed within a range of the RFID reader and comprising a unique identifier, and wherein the gaming console is configured to display a user interface on the touchscreen, select the game. wait for gamepieces to be placed on the touchscreen, detect and read each gamepiece, access a database to authenticate a profile associated with each gamepiece, and use the profile, the position, and the orientation of each gamepiece to conduct the game.

20 Claims, 18 Drawing Sheets

(56) References Cited

U.S. PATENT DOCUMENTS

| | | |
|---|---|---|
| 6,579,175 B2 | 6/2003 | Suzuki |
| 6,674,995 B1 | 1/2004 | Meyers et al. |
| 7,934,983 B1 | 5/2011 | Eisner |
| 8,038,532 B2 | 10/2011 | Neervoort et al. |
| 8,102,515 B2 | 1/2012 | Skultety-Betz et al. |
| 8,217,913 B2 | 7/2012 | Hotelling et al. |
| 8,248,367 B1 | 8/2012 | Barney et al. |
| 8,358,286 B2 | 1/2013 | Cannon |
| 8,502,651 B2 | 8/2013 | Birnbaum |
| 8,540,569 B2 | 9/2013 | Orlinsky et al. |
| 8,602,857 B2 | 12/2013 | Morichau-Beauchant et al. |
| 8,702,512 B2 | 4/2014 | Mineur et al. |
| 8,702,515 B2 | 4/2014 | Weston et al. |
| 8,715,061 B1 * | 5/2014 | Post .................. A63F 1/06 463/20 |
| 8,777,743 B2 | 7/2014 | Cousins |
| 8,920,236 B2 | 12/2014 | Kelly et al. |
| 8,974,295 B2 | 3/2015 | Maharbiz et al. |
| 9,028,315 B2 | 5/2015 | Morichau-Beauchant et al. |
| 9,114,940 B2 | 8/2015 | Kraegeloh et al. |
| 9,141,138 B2 | 9/2015 | Stucke, Jr. et al. |
| 9,174,116 B2 | 11/2015 | Wouhaybi et al. |
| 9,174,131 B2 | 11/2015 | Shirasaka et al. |
| 9,178,572 B1 | 11/2015 | Zhang |
| 9,274,641 B2 | 3/2016 | Heatherly et al. |
| 9,283,473 B2 | 3/2016 | Tagawa et al. |
| 9,289,679 B2 | 3/2016 | Okura et al. |
| 9,339,729 B2 | 5/2016 | Heatherly et al. |
| 9,586,139 B2 | 3/2017 | Jabara et al. |
| 9,649,551 B2 | 5/2017 | Maharbiz et al. |
| 9,662,571 B1 | 5/2017 | Jabara et al. |
| 9,696,757 B2 | 7/2017 | Scott et al. |
| 9,716,533 B2 | 7/2017 | Shimomura et al. |
| 9,717,981 B2 | 8/2017 | Robbins et al. |
| 9,737,802 B2 | 8/2017 | Shi et al. |
| 9,776,071 B2 | 10/2017 | Amireh et al. |
| 9,808,706 B2 | 11/2017 | Jaqua et al. |
| 9,849,369 B2 | 12/2017 | Maharbiz et al. |
| 9,855,500 B2 | 1/2018 | Jabara et al. |
| 9,861,882 B2 | 1/2018 | Yim et al. |
| 9,884,254 B2 | 2/2018 | Yim et al. |
| 9,919,226 B2 | 3/2018 | Scott et al. |
| 9,923,606 B2 | 3/2018 | Shimomura et al. |
| 10,088,925 B2 | 10/2018 | Duteil et al. |
| 10,155,152 B2 | 12/2018 | Maharbiz et al. |
| 10,155,156 B2 | 12/2018 | Jaqua et al. |
| 10,183,212 B2 | 1/2019 | Maharbiz et al. |
| 10,185,296 B2 | 1/2019 | Rehkemper et al. |
| 10,216,300 B2 | 2/2019 | Hanson |
| 10,232,261 B2 | 3/2019 | Yim et al. |
| 10,238,961 B2 | 3/2019 | Fogtmann et al. |
| 10,238,967 B2 | 3/2019 | Yim et al. |
| 10,261,641 B2 | 4/2019 | Fogtmann et al. |
| 10,265,609 B2 | 4/2019 | Maharbiz et al. |
| 10,369,477 B2 | 8/2019 | Scott et al. |
| 10,413,807 B2 | 9/2019 | Amireh et al. |
| 10,444,876 B2 | 10/2019 | Hanson |
| 10,456,660 B2 | 10/2019 | Maharbiz et al. |
| 10,456,675 B2 | 10/2019 | Morichau-Beauchant et al. |
| 10,478,717 B2 | 11/2019 | Robbins et al. |
| 10,478,723 B2 | 11/2019 | Scott et al. |
| 10,500,497 B2 | 12/2019 | Scott et al. |
| 10,510,189 B2 | 12/2019 | Numaguchi et al. |
| 10,518,188 B2 | 12/2019 | Villar et al. |
| 10,525,342 B2 | 1/2020 | Ueno et al. |
| 10,537,820 B2 | 1/2020 | Dawes |
| 10,537,821 B2 | 1/2020 | Zhang et al. |
| 10,569,171 B2 | 2/2020 | Peterson et al. |
| 10,583,354 B2 | 3/2020 | Muthyala et al. |
| 10,596,461 B2 | 3/2020 | Onozawa et al. |
| 10,607,502 B2 | 3/2020 | Butler et al. |
| 10,646,780 B2 | 5/2020 | Laulund et al. |
| 10,649,603 B2 | 5/2020 | Fogtmann et al. |
| 10,864,440 B2 | 12/2020 | Yim et al. |
| 10,953,312 B1 | 3/2021 | Lee |
| 10,953,314 B2 | 3/2021 | Maharbiz et al. |
| 10,994,191 B2 | 5/2021 | Amireh et al. |
| 11,110,341 B2 | 9/2021 | Knippen |
| 2002/0004723 A1 | 1/2002 | Meifu et al. |
| 2002/0006825 A1 | 1/2002 | Suzuki |
| 2004/0157527 A1 | 8/2004 | Omar |
| 2004/0248650 A1 | 12/2004 | Colbert et al. |
| 2005/0009608 A1 | 1/2005 | Robarts et al. |
| 2005/0250590 A1 | 11/2005 | Doaga et al. |
| 2006/0154713 A1 | 7/2006 | Sunazuka et al. |
| 2006/0205508 A1 | 9/2006 | Green |
| 2007/0265096 A1 | 11/2007 | Kouno et al. |
| 2007/0279392 A1 | 12/2007 | Rosenberg et al. |
| 2008/0004110 A1 | 1/2008 | Cortenraad et al. |
| 2008/0161086 A1 * | 7/2008 | Deere .................. A63F 3/02 463/14 |
| 2008/0278314 A1 | 11/2008 | Miller et al. |
| 2009/0005140 A1 | 1/2009 | Rose et al. |
| 2009/0076784 A1 | 3/2009 | Ong et al. |
| 2009/0082106 A1 | 3/2009 | Yang |
| 2009/0315258 A1 | 12/2009 | Wallace et al. |
| 2010/0032900 A1 | 2/2010 | Wilm |
| 2011/0234493 A1 | 9/2011 | Kravits et al. |
| 2012/0049453 A1 * | 3/2012 | Morichau-Beauchant .................. A63F 9/24 273/236 |
| 2012/0052931 A1 * | 3/2012 | Jaqua .................. A63F 3/00643 463/1 |
| 2012/0052934 A1 | 3/2012 | Maharbiz et al. |
| 2012/0062490 A1 | 3/2012 | Heatherly et al. |
| 2012/0142422 A1 | 6/2012 | Mori |
| 2012/0194457 A1 | 8/2012 | Cannon et al. |
| 2013/0217496 A1 * | 8/2013 | Olkin .................. A63F 3/00697 463/32 |
| 2013/0270769 A1 * | 10/2013 | Powell .................. A63F 9/12 273/157 R |
| 2014/0057691 A1 | 2/2014 | Morichau-Beauchant et al. |
| 2015/0118958 A1 | 4/2015 | Jain et al. |
| 2015/0339568 A1 | 11/2015 | Nekoogar et al. |
| 2016/0085955 A1 | 3/2016 | Lerner |
| 2016/0314617 A1 | 10/2016 | Forster et al. |
| 2016/0364124 A1 | 12/2016 | Heater |
| 2017/0010584 A1 | 1/2017 | Kim |
| 2017/0072645 A1 | 3/2017 | Abeloe |
| 2017/0124364 A1 | 5/2017 | Villar et al. |
| 2017/0136354 A1 | 5/2017 | Yamano et al. |
| 2017/0154328 A1 | 6/2017 | Zarakas et al. |
| 2017/0232335 A1 * | 8/2017 | Williams .................. A63F 13/50 463/31 |
| 2017/0232348 A1 | 8/2017 | Williams et al. |
| 2017/0255829 A1 | 9/2017 | Chang et al. |
| 2019/0232154 A1 * | 8/2019 | Kurabayashi .................. G06F 3/041 |
| 2019/0339658 A1 | 11/2019 | Newell et al. |
| 2019/0348209 A1 | 11/2019 | Wen et al. |
| 2020/0184041 A1 | 6/2020 | Andon et al. |

OTHER PUBLICATIONS

Office Action dated Nov. 15, 2021 for U.S. Appl. No. 15/425,637.

\* cited by examiner

APPLICATION OF RFID GAMEPIECES FOR A GAMING CONSOLE

TECHNICAL FIELD

Aspects of the disclosure relate to the field of radio-frequency identification (RFID) and, more particularly, to the application of RFID gamepieces for a gaming console. Exemplary embodiments describe a virtual gaming console using multiple RFID gamepieces simultaneously.

BACKGROUND

Tabletop board games offer opportunities for friends and family to bond, share, and connect while playing games together. In contrast to console video gaming systems that focus on a television screen, tabletop games allow friends and family to meet elbow-to-elbow, huddled around a common focus point. Indeed, myriad tabletop games exist, both in the past and the present, that can be enjoyed together and offer opportunities to connect.

Additional benefits can be derived from using a gaming console, a computing device on which a plethora of games can be virtualized. Such games can include chess, Dungeons & Dragons, and Magic the Gathering for which valuable statues, figurines, and similar game pieces can be used. Countless board games can also be virtualized in the gaming console.

Unfortunately, storing, maintaining, and organizing such gamepieces, not to mention lugging them from place to place, is a challenge. Additional inconvenience can arise from needing to remember and organize login credentials for different games.

SUMMARY

One or more embodiments described herein, among other benefits, solve one or more of the foregoing problems by the application of radio-frequency identification (RFID) gamepieces for a gaming console. In one embodiment, a gaming console includes a processor, a touchscreen to detect RFID gamepieces placed thereon and overlaying an RFID reader.

The disclosed gamepiece can have several different designs, each of which has a base containing an RFID tag. In some embodiments, the base is placed directly on the touchscreen. In some other embodiments the base is supported by a central and a peripheral support having a predefined footprint usable to detect its position and orientation and tall enough to support the base above a touchscreen detection zone, the RFID tag disposed within a range of the RFID reader and comprising a unique identifier. In yet other embodiments, the base is supported by a single support, offset from the center of the base.

The gaming console further has access to a database having entries associating users and their profiles with the unique identifiers in gamepieces, and further associating users with games for which they are licensed.

In operation, the gaming console is configured to display a user interface on the touchscreen, select the game. wait for gamepieces to be placed on the touchscreen, detect, and read each gamepiece, access a database to authenticate a profile associated with each gamepiece, and use the profile, the position, and the orientation of each gamepiece to conduct the game.

Further areas of applicability of the present disclosure will become apparent from the detailed description, the claims, and the drawings. The detailed description and specific examples are intended for illustration only and are not intended to limit the scope of the disclosure.

BRIEF DESCRIPTION OF THE DRAWINGS

In order to describe the manner in which the above-recited and other advantages and features can be obtained, a more particular description is set forth and will be rendered by reference to specific examples thereof which are illustrated in the drawings. Understanding that these drawings depict only typical examples and are not therefore to be considered to limit its scope, implementations will be described and explained with additional specificity and detail through the use of the accompanying drawings.

Figure 1A:
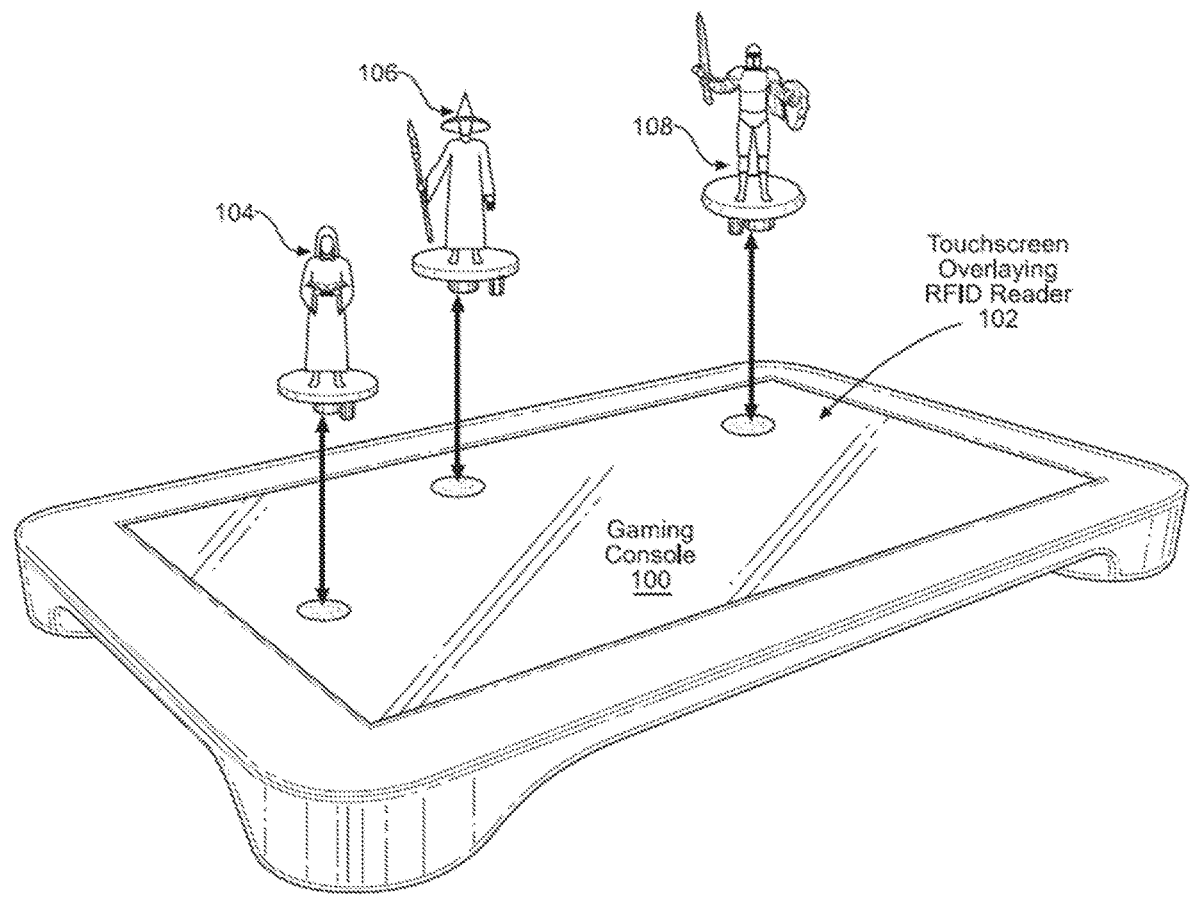
FIG. 1A illustrates an embodiment of a gaming console using multiple RFID gamepieces.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

As mentioned above, storing, maintaining, and organizing such gamepieces, not to mention lugging them from place to place, is a challenge. In one embodiment, a gaming console includes a processor, a touchscreen to detect RFID gamepieces placed thereon and overlaying an RFID reader. The gaming console detects an RFID tag housed within each gamepiece. The RFID tag includes a unique identifier.

In some embodiments, each gamepiece has a base containing the RFID tag, the base being supported by central and peripheral supports with predefined footprints and separated by a predefined distance. In such embodiments, the gaming console can detect the gamepiece position and orientation using the predefined dimensions. Furthermore, in some such embodiments, the central and peripheral supports are tall enough to support the base above a touchscreen detection zone and below an RFID detection limit. The gaming console further has access to a database having entries associating users and their profiles with the unique identifiers in gamepieces, and further associating users with games for which they are licensed. In the context of some of the gaming consoles disclosed herein, the predetermined footprint comprises a central circular touch point having a first predetermined diameter, a peripheral circular touch point having a second, smaller predetermined diameter, and the central circular touch point having its center a predetermined distance away from a center of the peripheral circular touch point.

In operation, the gaming console is configured to display a user interface on the touchscreen, select the game. wait for gamepieces to be placed on the touchscreen, detect, and read RFID tags in each gamepiece, use the unique identifier from the RFID tag to access a database to authenticate a profile associated with each gamepiece, and use the profile, the position, and the orientation of each gamepiece to conduct the game.

Some alternate, inferior approaches call for each player to manage multiple game pieces for multiple games. Each player in such approaches may need to manage dozens of gamepieces. Advantageously, disclosed embodiments allow the same gamepiece to be used in the context of several games. Each player, for example, need only maintain as few as a single RFID gamepiece, which the disclosed gaming console can use for any of several different games.

Some alternate, inferior approaches depend solely on the touchscreen to log in and authenticate multiple users into the gaming console. For example, the touchscreen can present a user interface having a space for each of the users to enter their usernames (or email addresses or other identification) and passwords. Or each player can enter credentials on the touchscreen and pass the gaming console to the next player to enter credentials. Either way, passing the gaming console among the players to allow them to enter their credentials can be awkward and inefficient. Advantageously, according to disclosed embodiments, the multiple players can log in to the gaming console simply by placing their gamepieces on the touchscreen. In response, the gaming console reads the unique identifier stored in the RFID tag of each of several gamepieces and then uses each unique identifier to look up a user profile in a database.

Also, in the context of some of the gaming consoles disclosed herein, each of the gamepieces enables its associated user to log in to the gaming console without requiring entry of login credentials on the user interface.

In some embodiments, each of the gamepieces disclosed herein is a passive RFID tag lacking a power source, and instead is supplied with energy via an electromagnetic field produced by the RFID reader.

Also, in the context of some of the gaming consoles disclosed herein, an RFID gamepiece is a non-player character (NPC) representing an artificial intelligence player. This non-player character can be based on an existing and/or recognizable character from games or pop media, and the gaming console will fetch the pictures, icons, and arts associated with this character from the database and display them during gameplay. This artificial intelligence player will engage in gameplay with real players representing that non-player character.

An RFID gamepiece can represent a macro to be executed after the gamepiece is placed on the touchscreen. For example, a gamepiece representing "exit" will end the currently running game and display the main home screen on the gaming console. Such an RFID gamepiece enables a simple mechanism that performs simple but essential tasks across different games or scenarios on the gaming console.

Also, in the context of some of the gaming consoles disclosed herein, the user interface provides a way to select the game.

Some embodiments of the gaming console disclosed herein further include a network interface, wherein the network interface is used to download the database from a server. For example, some such embodiments include a local network interface, such as those to enable a local network according to the IEEE 8-2 set of protocols promulgated by the Institute of Electrical and Electronics Engineers. Additionally, some embodiments include an interface to enable common Internet protocols, such as TCP/IP (Transmission Control Protocol/Internet Protocol), UDP/IP (User Datagram Protocol/Internet Protocol), HTTP (HyperText Transfer Protocol) and FTP (File Transfer Protocol).

In some embodiments of the disclosed gaming console, instructions to execute the game are not natively on the system but must instead be loaded into the memory. For example, the gaming console can use the network interface to download instructions from a local or remote server. In other examples, instructions for conducting a game can be loaded from a computer-readable medium, such as a storage medium such as a CDROM drive or flash drive. In some such embodiments, the gaming console displays a purchase interface for use by each user, as needed, select, and purchase a license to access the game.

In some embodiments, for example as illustrated and described in the figures, the touchscreen is logically partitioned into a different region for each user.

Embodiments of the invention, as described and disclosed herein, offer solutions to these problems. Described is a gaming console (a.k.a, virtual gaming console, computing device), equipped with a processor, a touchscreen, and an RFID reader consisting of multiple RFID antennas. In some embodiments, the RFID reader contains N RFID antennas, allowing a one-to-one connection with each of N gamepieces. In other embodiments, the RFID reader includes antennas that each connect with multiple gamepieces.

The Gaming Console

The gaming console claimed and described herein can take on many different hardware forms, as long as it includes a touchscreen, an RFID reader (or NFC antennas), and a processor and is able to pair simultaneously with up to N RFID gamepieces (or NFC tags). In some embodiments, the gaming console is a virtual gaming device, such as gaming console 100 illustrated in FIG. 1. In some embodiments, the gaming console is a tablet computer loaded with instructions stored on a non-transitory computer-readable medium, the instructions causing the tablet computer to perform methods as described herein, for example the methods illustrated and described with respect to FIG. 7A and FIG. 7B.

RFID Technology

As is known, radio-frequency identification (RFID technology uses radio waves produced by a reader to detect the presence of (then read the data stored on) an RFID tag.

Disclosed embodiments include an RFID reader that includes RFID antennas to communicate with gamepieces, which can be RFID tags. The disclosed RFID reader contains one or more RFID antennas, each of which pairs with one or more RFID tags. In some embodiments, each RFID antenna maps one-to-one with a single RFID tag, such that the gaming console contains N RFID antennas to pair with N RFID tags. In other embodiments, the gaming console contains fewer than N RFID antennas, some of which pair with more than one RFID tag. For example, the gaming console can contain a single RFID antenna that reads up to N RFID tags.

RFID tags can be active, meaning they have their own power source, or they can be passive, meaning they have no own power source and have to be supplied with energy via an electromagnetic field produced by the reader.

Passive tags are available in three different RFID frequency ranges: Low frequency (LF), high frequency (HF) and ultra-high frequency (UHF). The reading range of LF and HF systems is usually only a few centimeters. Some RFID tags are readable and writeable, while others are only readable. In some embodiments, each RFID antenna can communicate with at most one RFID tag, while in other embodiments, each RFID antenna can communicate with multiple RFID tags simultaneously.

NFC Technology

As is known, Near-Field Communication (NFC) is also based on the RFID protocols. NFC and RFID systems operate at the same frequency: 13.56 MHz. An NFC device, however, can act not only as a reader, but also as a tag (card emulation mode). In peer-to-peer mode, it is also possible to transfer information between two NFC devices. To the extent that both NFC devices and RFID devices can be used to read tag information, they are sometimes referred to herein interchangeably.

Figure 9:
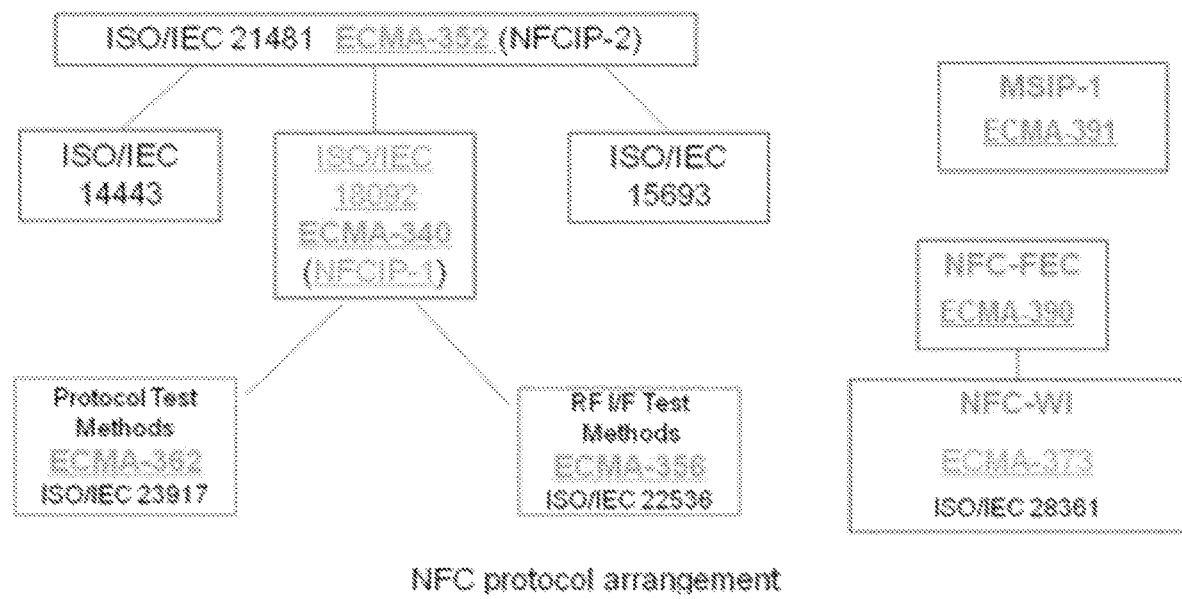
FIG. 9 depicts a protocol stack of NFC standards.

In some embodiments, NFC antennas disposed underneath the touchscreen simultaneously pair with multiple NFC devices (NFC tags) in accordance with one or more international standards, some of which are illustrated and described in the protocol tree of FIG. 9. In operation, NFC antennas establish connections with NFC devices in one of three different modes, which are reader/writer mode, peer-to-peer mode, and card emulation mode.

Today, NFC tags are known to come in five types. Some NFC tags of different types are fully programmable. In other words, the processor of the disclosed computing device can be further configured to cause write data to be written to an NFC device (NFC tag) from an NFC antenna. For example, the write data can consist of log data to log a use of the NFC device (NFC tag), ownership information, game piece characteristics (available functions, special moves, appearance, etc.), payment information, security information, identity information, and Blockchain data. Use of NFC tags is further described with respect to their use as gamepieces in exemplary gaming applications such as those listed in Tables 1, 2, and 3.

Using an Electronic Device as a Gamepiece

In some embodiments, an electronic device, such as a mobile phone, is capable of operating as a tag (card emulation) and can be used as a gamepiece. In some such embodiments, an RFID-capable mobile phone can be held above the gaming console touchscreen at a location where a gamepiece would otherwise be placed. The gaming console in such embodiments is then configured to read RFID tag information (e.g., unique identifier) from the mobile phone.

In some other such embodiments, a dongle or dummy-gamepiece having the requisite predefined footprint is placed on the touchscreen. The gaming console then attempts to read the unique identifier from the RFID gamepiece. The cell phone then responds to the query and provides the unique identifier. Note that the cell phone, having its own power source, is capable of acting as an active RFID tag or NFC tag, and may therefore communicate with the gaming console RFID antenna at a longer range.

NFC devices (NFC tags) bear a unique identifier (UID) that identifies a manufacturer and a serial number. The processor of disclosed embodiments reads the UID, a format for which is further described and illustrated in FIG. 8.

The Antennas

In some embodiments of the disclosed gaming console that use NFC tags, the processor is to select an NFC antenna to pair with each of multiple NFC devices (NFC tags) that are placed on the touchscreen. In so doing, in some embodiments, the processor only considers those NFC antennas not already paired with an NFC device. In some such embodiments, the processor selects a single, nearby antenna. In other embodiments, the processor selects an antenna directly below the touchscreen zone touched by the NFC device. In yet other embodiments, the processor conducts measurements using a number of candidate antennas, then selects the antenna that exhibited the highest quality reading, for example in terms of signal strength, voltage level, and/or noise level. The number of candidate antennas can be 1, 2, 3, 4, and so on.

The Touchscreen

The touchscreen used in disclosed and claimed embodiments can use any of several touchscreen technologies, including resistive, capacitive, and infrared (IR) technologies.

The touchscreen in some embodiments is logically partitioned into N zones, and overlays a stacked, 3-dimentional antenna having at least N NFC or RFID antennas. In operation, the gaming console displays a user interface for an application (e.g., a game) on the touchscreen. When up to N devices, be they NFC tags or RFID gamepieces, are placed on the touchscreen, the gaming console, for each gamepiece, selects an antenna to establish a connection therewith, reads tag a unique identifier from the gamepiece, and passes the unique identifier to the processor to conduct the game.

Resistive touchscreens are relatively basic and common touch screens and can be used in cost-sensitive embodiments. Resistive touchscreens work by having two electrically conductive layers bend to touch one another. Resistive touch screens are durable and consistent but can be harder to read and can only handle one touch at a time, ruling out, for example, a two-finger zoom.

Capacitive touchscreens, in contrast, do not use the pressure of a finger to create a change in the flow of electricity. Instead, they work with anything that holds an electrical charge—including human skin. Capacitive touch screens sometimes use patterned glass to achieve desired capacitive conditions.

IR touchscreens identify touch by detecting interruptions in a uniform beam of light. In some embodiments, IR touchscreens have a grid-like array of LED lights and photodetectors (sensors) around the edges of the device. These LEDs constantly emit and project light. When the IR touchscreen surface is touched, it creates a disturbance in this light. The device can then determine where this disturbance occurred to identify the precise point of contact. For their part, IR touchscreens share some advantages of both resistive and capacitive touchscreens. An IR touchscreen can provide better durability than a comparably sized capacitive touchscreen, at least insofar as it does not require patterned or similarly brittle glass, and better sensitivity than a comparably sized resistive touchscreen at least insofar as it does not require as much force or as consistent an amount of force in a touch.

The Gamepiece

Some embodiments of the disclosed gaming device use gamepieces placed on the touchscreen to conduct a game. For example, as illustrated and described in the figures, the gamepiece can include an RFID (or NFC) tag inside a freestanding housing having a predefined footprint.

Each RFID (or NFC) tag contains a unique identifier that can be used to retrieve a user profile and relevant characteristics for a user. In some embodiments, such user profile information is stored in the RFID gamepiece (or NFC tag).

Table 1 lists some examples of information that can be stored in a user profile. For example, the user identifier, the username, and/or the user email address can be used to associate a user profile with each gamepiece. The gamepiece unique identifier can be used to lookup the user profile in a local or remote database. The gamepiece information further includes gamepiece attributes, gamepiece device configuration, and gamepiece game access.

TABLE 1

| Gamepiece Information | |
| --- | --- |
| Gamepiece Information | Data Type |
| User Identifier | Integer |
| Username+ | String |
| Email address | String |
| Gamepiece Unique Identifier | String |
| Gamepiece attributes | Json |
| Gamepiece device configuration | Json |
| Gamepiece game access | Json |

Altering the Game Based on Gamepiece Content

Information stored on the gamepiece can further be used to automatically alter or adjust game play settings and the settings of the gaming console. For example, when an RFID gamepiece (or NFC tag) is associated with a user under 18 years of age, the gaming console can automatically restrict content to an age-appropriate level. For another example, when the gamepiece attributes specify a particular background profile or sound profile, the gaming console automatically configures the gameplay experience to suit.

The RFID gamepiece (or NFC tag) can also be used to enable and grant access to a particular game. When instructions to run a selected game are not present in the gaming console memory, the gaming console is configured to download that game over a network, for example from a central server.

In some embodiments, information stored on the RFID (or NFC) tag affects how the gaming console displays the selected game on the touchscreen. For example, the user profile stored on the database and associated with each gamepiece can contain an avatar to be displayed on the touchscreen to represent the player. Furthermore, the gaming console is sometimes configured to display historical information, such as performance metrics associated with each player and obtained from the use profile for each player.

When a game requires a license, the gaming console then grants access to the game to gamepieces whose owners have a license. If needed, the gaming console displays a purchase interface on the touchscreen to allow a user to purchase a license.

When gamepieces meant for use with a selected game are on the touchscreen, the gaming console is configured to enable and provide access to the game. In some embodiments, the gaming console further advantageously disables a game that has not been played for a threshold amount of time and frees up the memory space that was used to store instructions for that game. This decouples game access from the traditional factors such as device ownership and game purchase history of a particular gaming console.

Determining Gamepiece Orientation

The predetermined footprint of the gamepieces according to some embodiments can be detected by the touchscreen and can be used to determine an orientation of the gamepiece. The orientation can be expressed, for example, as an angle of a normal of the gamepiece with respect to zero degrees. Or the orientation can be expressed with relation to other gamepieces. Or the orientation can be expressed with respect to nearby objects. Or the orientation can be expressed simply as facing an edge of the touchscreen or facing a central portion of the screen. In some embodiments, the gaming console can be configured to report gamepiece orientation in a format suited to a selected game.

Figure 6A:
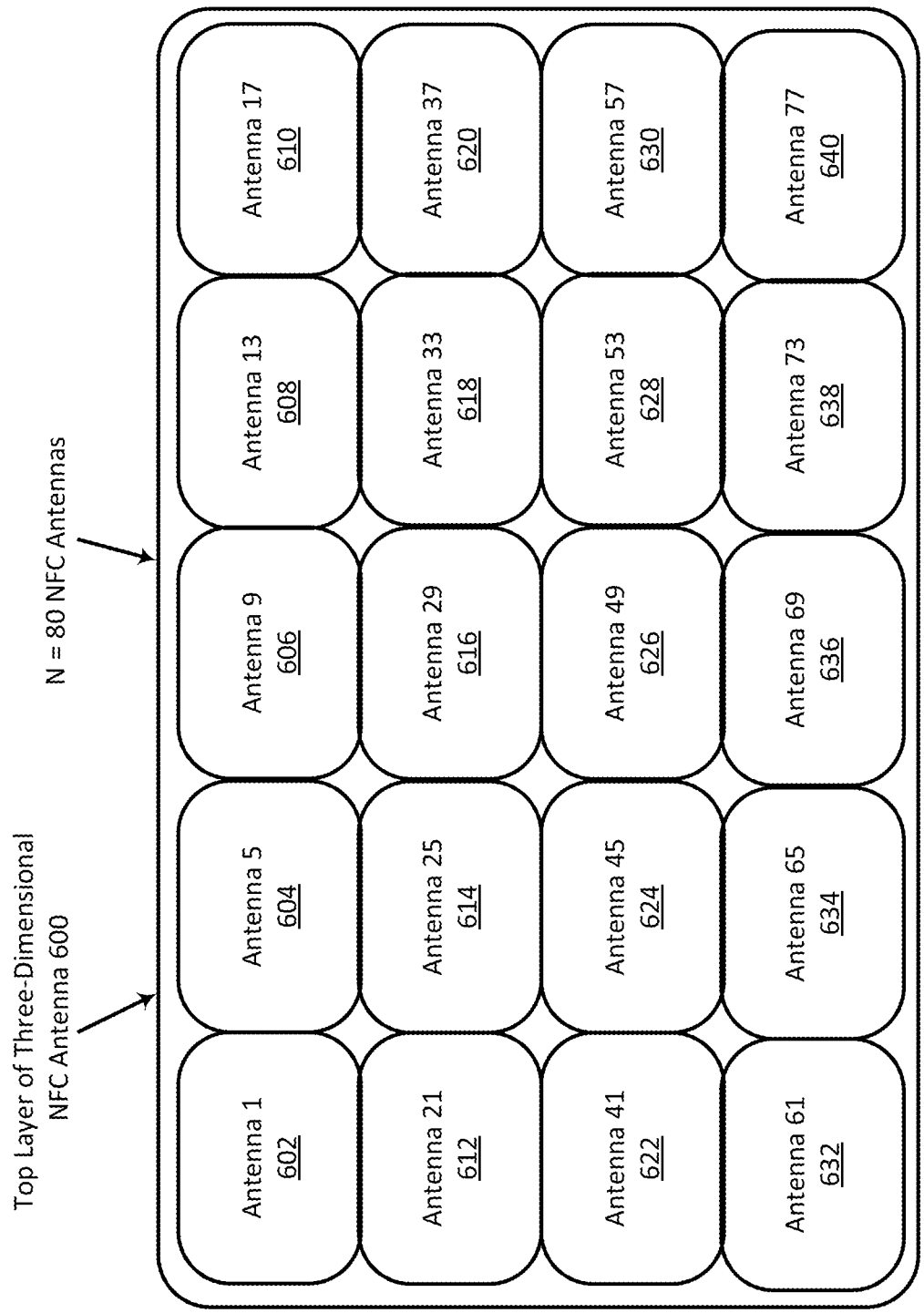
FIG. 6A illustrates a top view of a layer of antennas for use as part of an RFID reader, according to some embodiments.
Figure 6B:
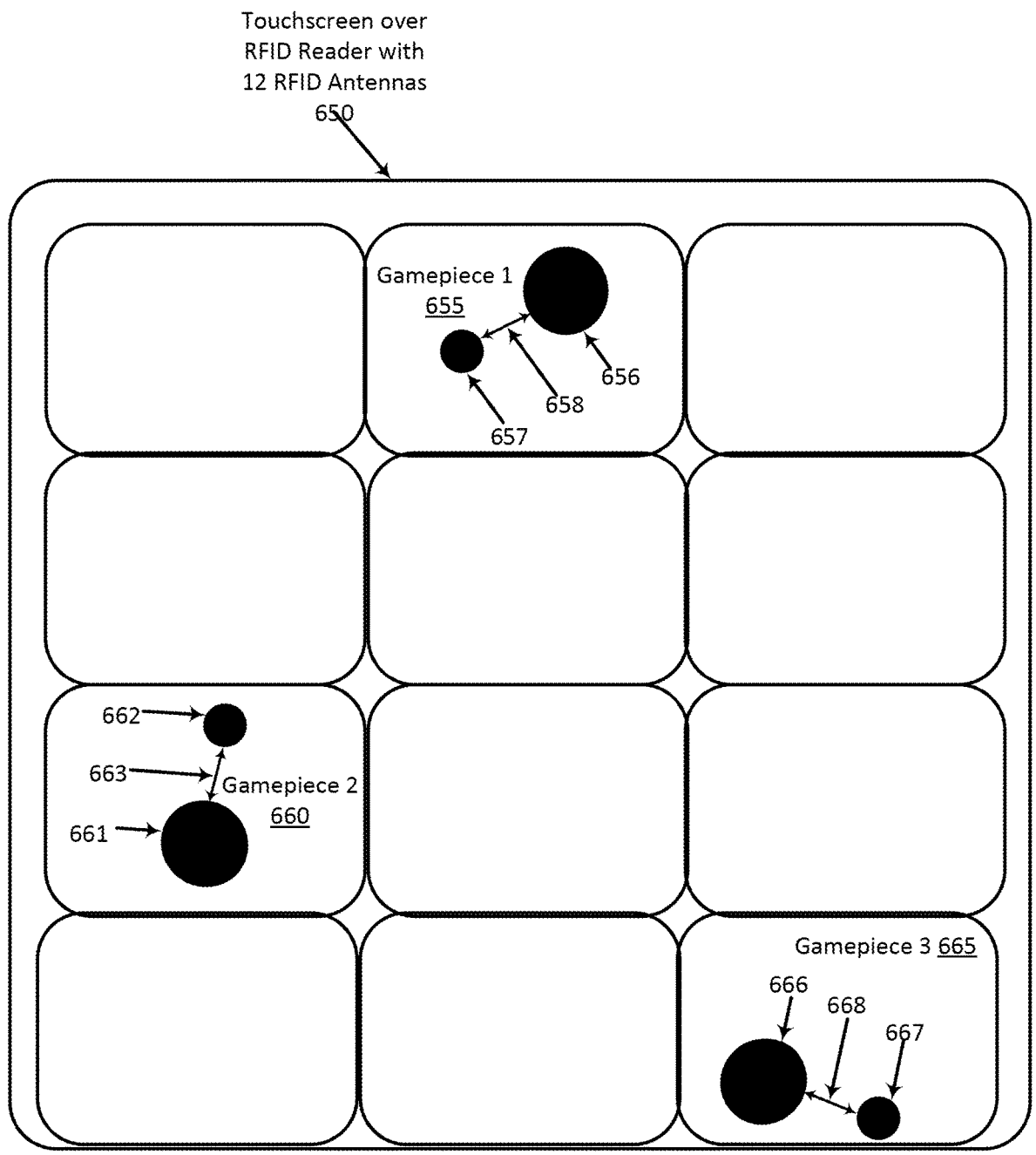
FIG. 6B illustrates a top view of an RFID reader with multiple gamepiece footprints thereon, according to an embodiment.

The predetermined footprint of gamepieces according to some disclosed embodiments includes two touchpoints (as shown in FIG. 6B) consisting of a central support footprint and a peripheral support footprint. If there are two touch points with diameters matching the two predetermined diameters and their centers are a predetermined distance apart, a gamepiece with orientation capability is identified and determined to be existing on the gaming console.

This gamepiece identifying position is based on the position of the central support (as opposed to the peripheral support), and the reading of the RFID tag is based on that x-y position. If more than two touch points are detected, all touch points that match either of the two predetermined diameters are identified as potential central support or peripheral support, and the distance is checked between all the central supports and all the peripheral supports, to determine which pair of central support and peripheral support make up a gamepiece with orientation capability.

The orientation is determined by the direction of the vector that goes from the central support to the peripheral support, and this direction typically matches the front-facing direction of the gamepiece figurine. The angle of rotation of the vector from the reference direction (0 degree) can be calculated by the gaming console to determine the orientation. This orientation information about the gamepiece provides additional data input for the gaming console that can be relevant and/or valuable for the gameplay, indicating which direction the player intends the gamepiece figurine to face.

In the context of an IR touchscreen, the height of the central and peripheral support cannot exceed the maximum height where the gaming console's RFID reader can still read the RFID tag because the RFID tag is located in the gamepiece base above the two supports elevated from the screen. If the gaming console uses an IR touchscreen, the height of the central and peripheral support must be greater than the height of the IR detection zone above the screen, because otherwise the gamepiece base would be identified by the IR touchscreen as one single large touch point and the two supports would not be detected.

Also, if additional material support is needed around the central and peripheral support for stability or appearance purposes, the material outside of the central and the peripheral support is made of material transparent to IR signals.

In some embodiments, the gaming console is configured to provide an alert, be it visual or aural, to indicate misplacement of a gamepiece. For example, when the gaming console detects an object on the touchscreen but is not able to detect its predefined footprint, an alert is generated.

The Game

As described above, disclosed embodiments enable simultaneously using multiple RFID gamepieces (or NFC tags) during execution of a game. In some embodiments, the game is a multi-player one that accommodates multiple users. For example, Table 2 lists a few examples of well-known board games or table-top games that can be performed virtually by the disclosed gaming console. The rules of operation of each of these games are understood, and not repeated here. But for each game, Table 2 lists the types and numbers of RFID gamepieces (or NFC tags) that can be used for several example multi-player table-top games or board games. For example, for a disclosed gaming console that uses one-to-one mappings of gamepieces to antennas, the gaming console can use 32 antennas to pair with each of 32 game pieces to execute the chess application. In some embodiments, fewer antennas—as few as one—are used to detect and read the gamepieces.

In some embodiments, RFID gamepieces (or NFC tags) contain data that lists the name of the piece, such as king, queen, rook, bishop, knight, and pawn. The data can further include the allowed moves of the game piece. For example, for a king piece, the data can indicate it is allowed to move one spot in any direction. in the case of writeable RFID gamepieces or NFC tags, the data can be updated to include information such as a current game state, a history of past moves, available functions, customizing characteristics, etc. In some embodiments using RFID gamepieces, a unique identifier is read from each RFID gamepiece (or NFC tag) and used to access a database where the name, the allowed moves, and the related information is stored. In some embodiments the database is stored in memory of the gaming console, while in other embodiments, the database is stored remotely and downloaded via a network interface of the gaming console.

In some embodiments, the gaming console is associated with a set of gamepieces having sufficient gamepieces to execute a multiplayer game from start to finish.

TABLE 2

Table-top Games and Boardgames

| Game | Description | Pieces |
| --- | --- | --- |
| Chess | 16 pieces per side | 32 |
| Catan | Chits, cities, dice, etc. | 65+ |
| Checkers | 12 pieces per side | 24 |
| Strategy | 40 pieces per side | 80 |
| ThinkFun | 18-piece math dice game | 18 |
| Ticket to Ride | Trains, Locomotives, Destinations | 100+ |

In some embodiments, the game is directed to fantasy sports or athletic competitions. For example, Table 3 lists just a few examples of well-known fantasy sports and athletics games that can be performed virtually by the disclosed gaming console. The rules of operation of each of these games are understood, and not repeated here. But for each game, Table 3 lists the types and numbers of RFID gamepieces (or NFC tags) that can be used. For example, a disclosed gaming console that uses a one-to-one mapping of antennas to RFID gamepieces (or NFC tags) can execute a four-player fantasy football game using 64 RFID gamepieces (or NFC tags).

TABLE 3

Fantasy Sports and Athletic Games

| Game | Roster Positions | Spots |
| --- | --- | --- |
| Fantasy Baseball | 16 starters, 5 bench | 21 |
| Fantasy Basketball | 5 starters, 8 bench | 13 |
| Fantasy Football | 9 starters, 7 bench | 16 |

TABLE 3-continued

Fantasy Sports and Athletic Games

| Game | Roster Positions | Spots |
| --- | --- | --- |
| Fantasy Hockey | 6 starters, 14 bench | 20 |
| Summer Sports | 15 track & field events | 15 |

In yet other embodiments, the selected game is a collectible figurine or trading card game. For example, Table 4 lists just a few examples of well-known collectible figurine and trading card games that can be conducted using the disclosed gaming console (or computing device). The rules of operation of each of these games are understood, so are not repeated here. But for each game, Table 4 lists the types of RFID gamepieces (or NFC tags) that can be used. In each case, the number of figurines and cards desired may be unlimited.

In embodiments that establish a one-to-one pairing between each RFID gamepiece (or NFC tag) and a respective antenna, the allowable number of gamepieces used depends on the number of available antennas. For example, a gaming console according to such embodiments can conduct any of the games listed in Table 4. In some embodiments such a gaming console includes a processor configured to map each of N logically partitioned zones of the touchscreen to one or more of N nearby antennas. The processor is further configured to display a user interface on the top layer, and when each of two or more RFID gamepieces (or NFC tags) is placed on the touchscreen, to establish a peer-to-peer connection between the antenna and the RFID gamepiece (or NFC tag). After pairing, the gaming console reads tag data and a unique identifier (UID) from each RFID gamepiece (or NFC tag) and passes the tag data and UID to the processor for use in conducting the game. In the case of Dungeons & Dragons, for example, the tag data can include information, such as special abilities, magic items, inventory, hit points, etc.

Build your party, live and in-person: To exemplify a further advantage, the disclosed gaming console can be used to enable multiple players to initialize the character details stored on each of their gamepieces. To do so, for example, a set of blank, programmable gamepieces, be they writeable RFID tags or NFC tags, is provided for each player. The user interface of the gaming console can display details about a character currently being generated. The players would use the gaming console to write player characteristics to tags through antennas.

TABLE 4

Collectible Figurine and Card Games

| Game | Game Piece Descriptions |
| --- | --- |
| Dungeons & Dragons | Players, Monsters |
| Pokemon | Pokemon characters |
| Jyhad (Vampire) | Collectible vampire cards |
| Magic the Gathering | Collectible card strategy game |
| Amiibo | Collectible figurine game |

The Figures

FIG. 1A depicts an embodiment of a gaming console using gamepieces, according to some embodiments. As shown, gaming console 100 includes a processor (not shown) to execute an application (e.g., a game) using information stored on radio-frequency identification (RFID) gamepieces 104, 106, and 108. Gaming console 100 includes a touchscreen 102 overlaying an RFID reader. The touchscreen in some embodiments is an IR touchscreen. An RFID reader (not visible) is disposed beneath the touchscreen. In some embodiments, the RFID reader is. a three-dimensional (3D) antenna that includes multiple antenna layers.

Figure 1B:
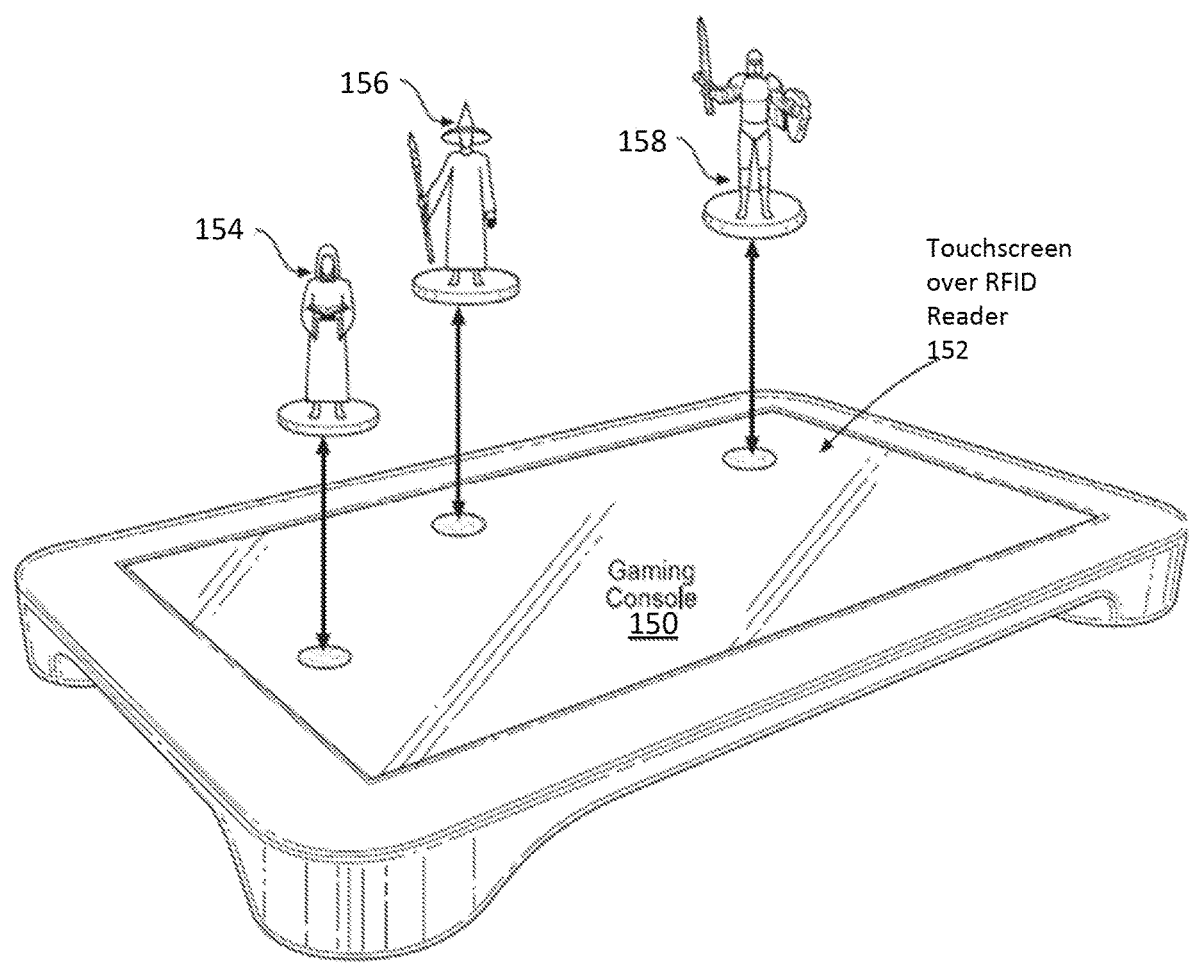
FIG. 1B illustrates another embodiment of a gaming console using multiple RFID gamepieces.

FIG. 1B depicts another embodiment of a gaming console using multiple RFID gamepieces. As shown, gaming console 150 includes a processor (not shown) to execute an application (e.g., a game) using information stored on RFID gamepieces 154, 156, and 158. Gaming console 150 includes a touchscreen 152 overlaying an RFID reader (not visible). The touchscreen in some embodiments is an IR touchscreen. In some embodiments, the RFID reader is. a three-dimensional (3D) antenna that includes multiple antenna layers.

It should be noted that gamepieces according to various embodiments can have different designs. A few embodiments of gamepieces are illustrated and described with respect to FIGS. 2A-2E. In particular, the gamepieces illustrated in FIG. 1A are akin to those illustrated in FIG. 2A and include a central support and a peripheral support. The gamepieces illustrated in FIG. 1B are akin to those illustrated in FIG. 2E and have a flat bottom without any additional supports.

Figure 2A:
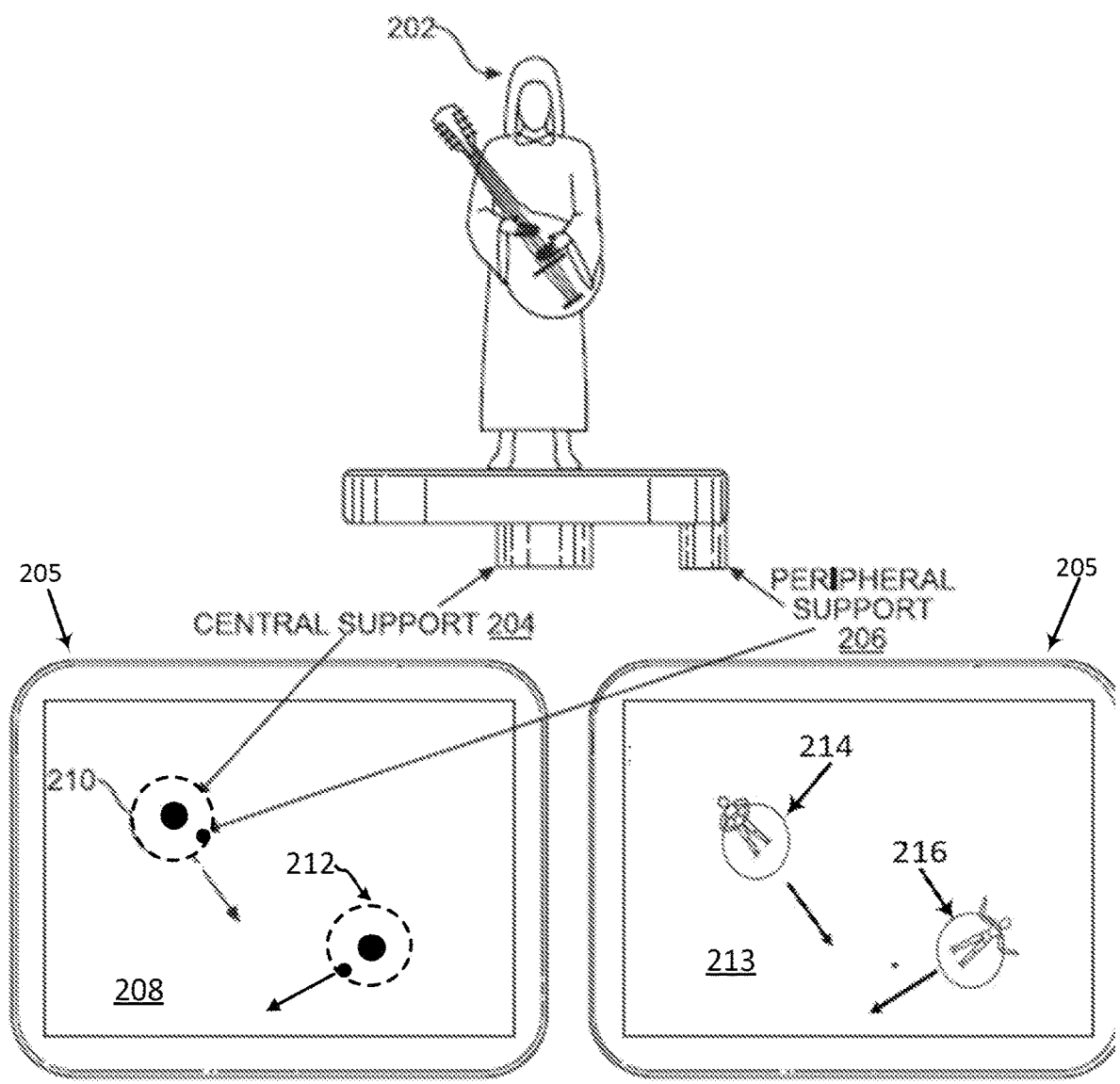
FIG. 2A illustrates an embodiment of a gamepiece and determining its orientation.

FIG. 2A illustrates an embodiment of a gamepiece and determining its orientation. As shown, gamepiece 202 includes central support 204 and peripheral support 206, together supporting the gamepiece on touchscreen 205. In operation, an RFID reader in the gaming console detects and reads an RFID tag inside the freestanding housing of gamepiece 202 having a predefined footprint. The predetermined footprint reflects central support 204 having a first predefined diameter and peripheral support 206 having a second, smaller predefined diameter. As shown, the central and peripheral supports are spaced apart by a predefined distance.

Here, touchscreen 205 is illustrated as top-view 208, showing the touch points (shaded) 210 and 212. Also shown is top view 213, showing those two gamepieces as 214 and 216. As shown, top views 208 and 213 include arrows showing an orientation for each of the gamepieces, i.e., which way each of the gamepieces is facing. Gamepiece 210 (and 214) is shown oriented toward (pointing toward or facing) the bottom right of the touchscreen 205. Gamepiece 212 (and 216) is oriented toward the bottom left.

Figure 2B:
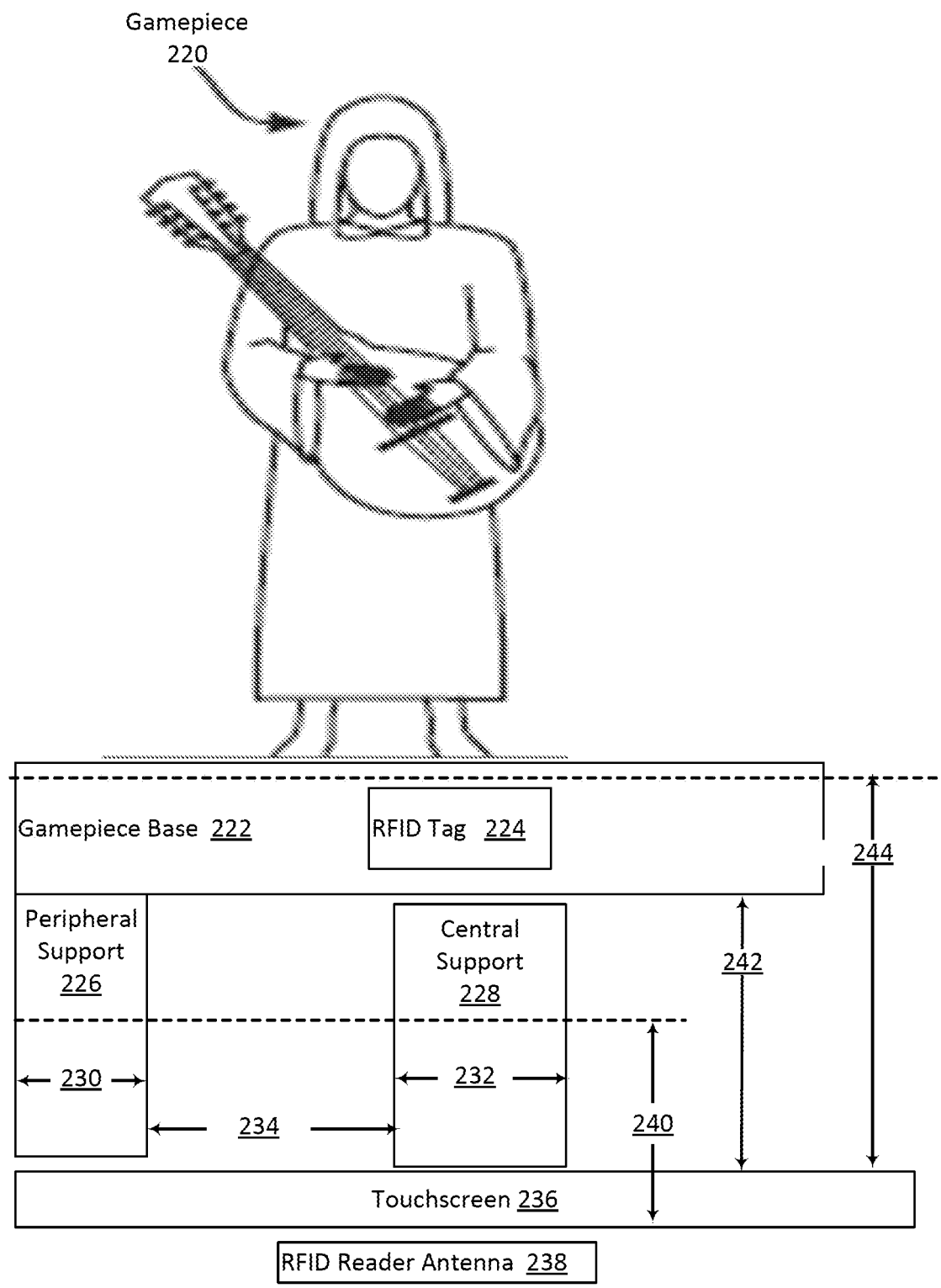
FIG. 2B illustrates further details about the gamepiece illustrated in FIG. 2A.

FIG. 2B illustrates further details about the gamepiece illustrated in FIG. 2A. As shown, gamepiece 220 includes gamepiece base 222 which houses RFID tag 224 and is supported by peripheral support 226 and central support 228. Peripheral support 226 has a first predefined diameter 230, and central support 228 has a second predefined diameter 232. The central and peripheral supports are spaced apart by predefined distance 234.

In operation, gamepiece 220 is placed on touchscreen 236, which detects the touchpoints of the central and peripheral supports. For example, as will be illustrated and described with respect to FIG. 6B, the touchscreen detects the position and diameter of the central and peripheral supports, as well as the spacing between them, for multiple gamepieces. Here, RFID reader antenna 238, disposed beneath touchscreen 236, detects the RFID tag 224 and reads the RFID tag information, which includes a unique identifier, therefrom.

It should be noted that, at least in the context of gaming consoles using gamepiece 202 with an IR touchscreen, the height of peripheral support 226 and central support 228 are together tall enough to support the bottom of gamepiece base 222 at a height 242, which is above the touchscreen detection zone 240 and below the RFID detection limit 244. Otherwise, if gamepiece base 222 were allowed to enter the touchscreen detection zone, it would make the footprint appear as one big spot, rather than two independent touch points. In some embodiments, the gaming console is tested during initialization or otherwise off-line to ensure that gamepieces can achieve necessary signal strength and power.

Distance 240 can be referred to as the touchscreen detection zone or touchscreen detection limit. Distance 242 is the distance of the gamepiece base 222 above the touchscreen. Distance 244 is the maximum RFID detection limit, a distance within which an RFID tag would be detected by the RFID reader. Distance 244 can also be referred to as the RFID detection range.

Figure 2C:
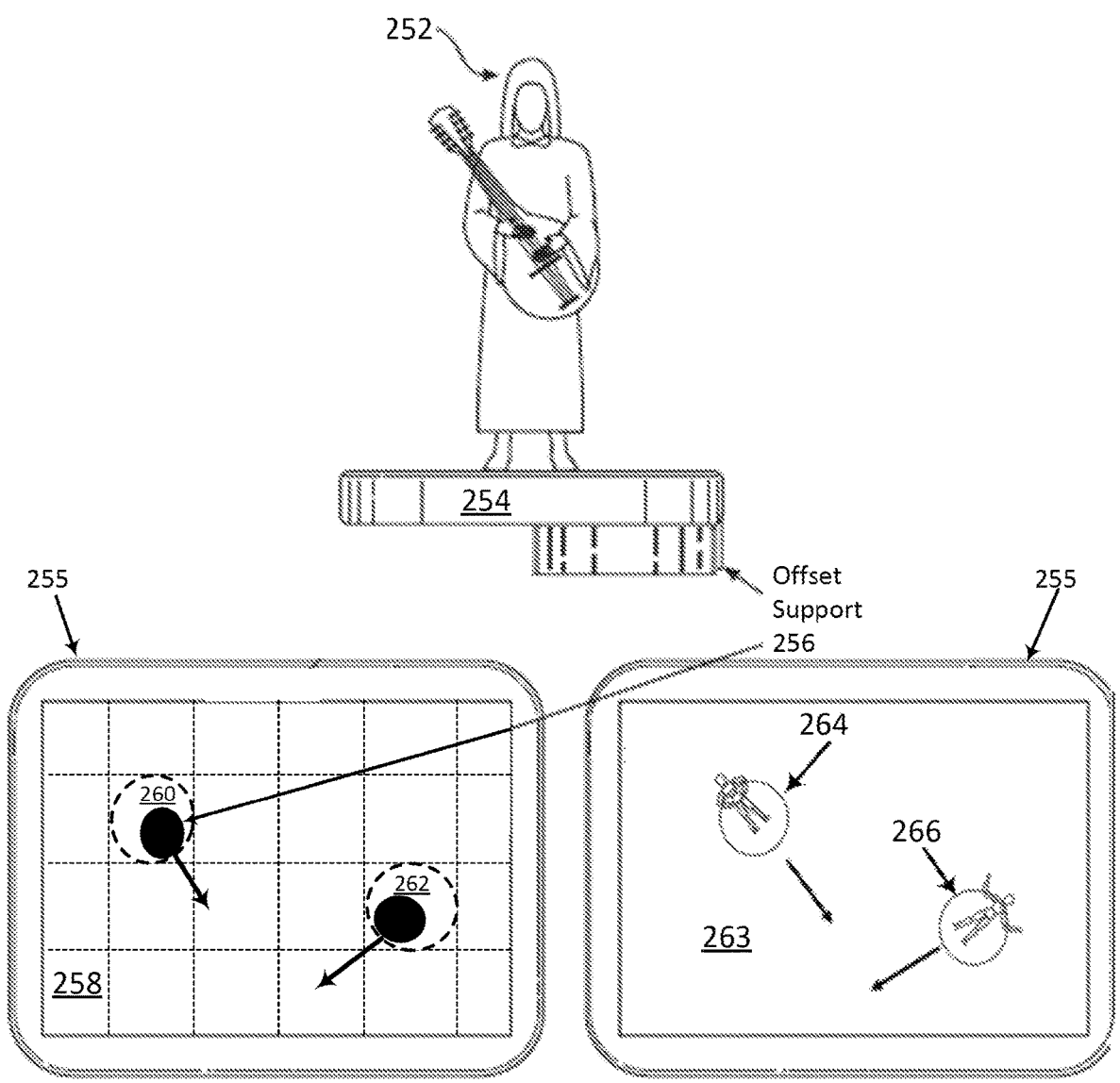
FIG. 2C illustrates another embodiment of a gamepiece and determining its orientation.

FIG. 2C illustrates another embodiment of a gamepiece and determining its orientation. As shown, gamepiece 252 is a figurine atop a gamepiece base 254 and supported by a single, offset support 256. Gamepiece base 254 houses an RFID tag, not shown, for use according to some embodiments. Also shown is a top view of touchscreen 258 on gaming console 255, illustrating the footprints of gamepiece 260, oriented toward the bottom right, and gamepiece 262, oriented toward to bottom left. Note that the touchpoint of each of the offset supports is darkened in, and the outline of the gamepieces 260 and 262 are represented as dashed lines, insofar as they are not touching the surface of the touchscreen.

For further illustration, touchscreen 263 of gaming console 255 is shown with similarly situated gamepiece 264, oriented toward the bottom right, and gamepiece 266, oriented toward the bottom left.

Unlike the gamepiece of FIG. 2A, determining the orientation of gamepieces shown here does not require or make use of the diameter of any touchpoint. Instead, determining orientation makes use of a predetermined grid or layout in the gameplay where each gamepiece is to be placed inside a predetermined set of spots each roughly matching the size of the gamepiece base. Once the gamepiece is placed at the center of the spot, the offset support will be offset from the center of the spot at a particular angle. A vector going from the center of the spot to the center of the offset support has an angle of rotation that the gaming console can calculate to determine the orientation of the gamepiece. In operation, with each gamepiece properly placed within a spot, the gaming console can determine gamepiece orientation by comparing the position of the offset support to the bounds of the spot in which it is disposed.

Note that in some embodiments, the grid of spots, represented here as dashed lines, is consistently displayed on the touchscreen during operation to indicate where gamepieces can be placed. In other embodiments, the grid of spots is only displayed during an initialization or setup phase of game play. In yet other embodiments, the gaming console provides a way for a user to cause the grid to be displayed, for example by a "show grid" button on the user interface of the touchscreen.

In some embodiments, the gaming console presents assistance or feedback on the touchscreen to enable users to place a gamepiece perfectly. For example, the gaming console can advise the user to move the gamepiece in one direction or another.

In some embodiments, each gamepiece includes some feedback, such as one or more LED bulbs that light up when the gamepiece is situated within a spot.

Figure 2D:
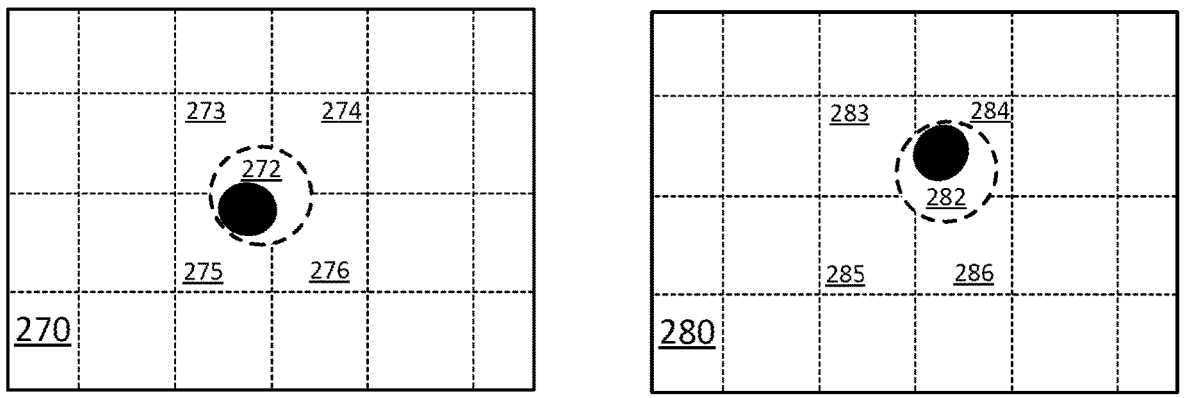
FIG. 2D illustrates further details about the gamepiece illustrated in FIG. 2C.

FIG. 2D illustrates further details about the gamepiece illustrated in FIG. 2C. As shown, single-support gamepieces 272 ad 282 have been placed with less-than-perfect placement. As shown, gamepiece 272 is placed on touchscreen 270, and is meant to occupy one of grid spots 273, 274, 275, and 276. In response, the gaming console is configured to conduct an RFID scan where it believes the gamepiece should be, based on the touchscreen location of the single, offset support. For example, here, based on the position of the offset support, the gaming console is configured to conduct an RFID scan at grid spot 275.

Similarly, gamepiece 282 is shown in top-view as having been less-than-perfectly placed on touchscreen 280 and is meant to occupy one of grid spots 283, 284, 285, and 286. In response, the gaming console is configured to conduct an RFID scan where it believes the gamepiece should be, based on the touchscreen location of the offset support. For example, here, based on the position of the offset support, the gaming console is configured to do an RFID scan at grid spot 284.

In some embodiments, the gaming console is configured to conduct an RFID scan on all potential grid spots in which the gamepiece could have been placed. For example, in some embodiments, the gaming console detects the location of gamepiece 272 by conducting an RFID scan at spots 273, 274, 275, and 276. For a similar example, in some embodiments, the gaming console detects the location of gamepiece 282 by conducting an RFID scan at spots 283, 284, 285, and 286.

In some embodiments, to correct for a gamepiece potentially being placed (for example, as illustrated by FIG. 2D) not perfectly on a predetermined grid spot or being placed in between the predetermined grid spots, the gaming console uses its user interface to provide visual indications or alerts at the grid spot it believes the gamepiece was intended to be placed at based on the location of the offset support. If the gamepiece is indeed at a location different from where the visual indication is, the visual indication prompts the user to correct the placement of the gamepiece. For example, in some embodiments, the gaming console determines that gamepiece 272 is intended to be placed at spot 275, because the touch location of the offset support is within spot 275. Although gamepiece 272 is originally placed at an ambiguous location, visual indication would appear at spot 275, prompting the user to center the gamepiece in spot 275, as opposed to sliding the gamepiece to spots 273, 274, or 276.

Figure 2E:
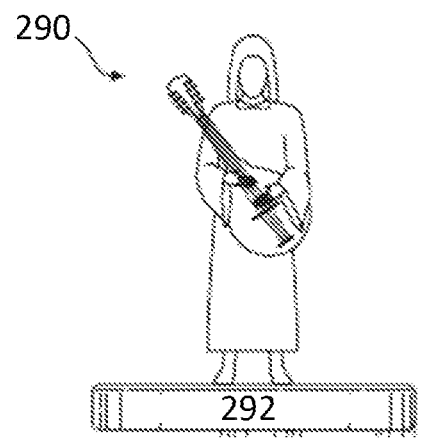
FIG. 2E illustrates another embodiment of a gamepiece containing an RFID tag.

FIG. 2E illustrates an embodiment of a gamepiece containing an RFID tag. As shown, gamepiece 290 is a figurine having a body portion above a base 292. According to disclosed embodiments, the gaming console is not configured to detect or utilize an orientation of the gamepiece 290.

Figure 3:
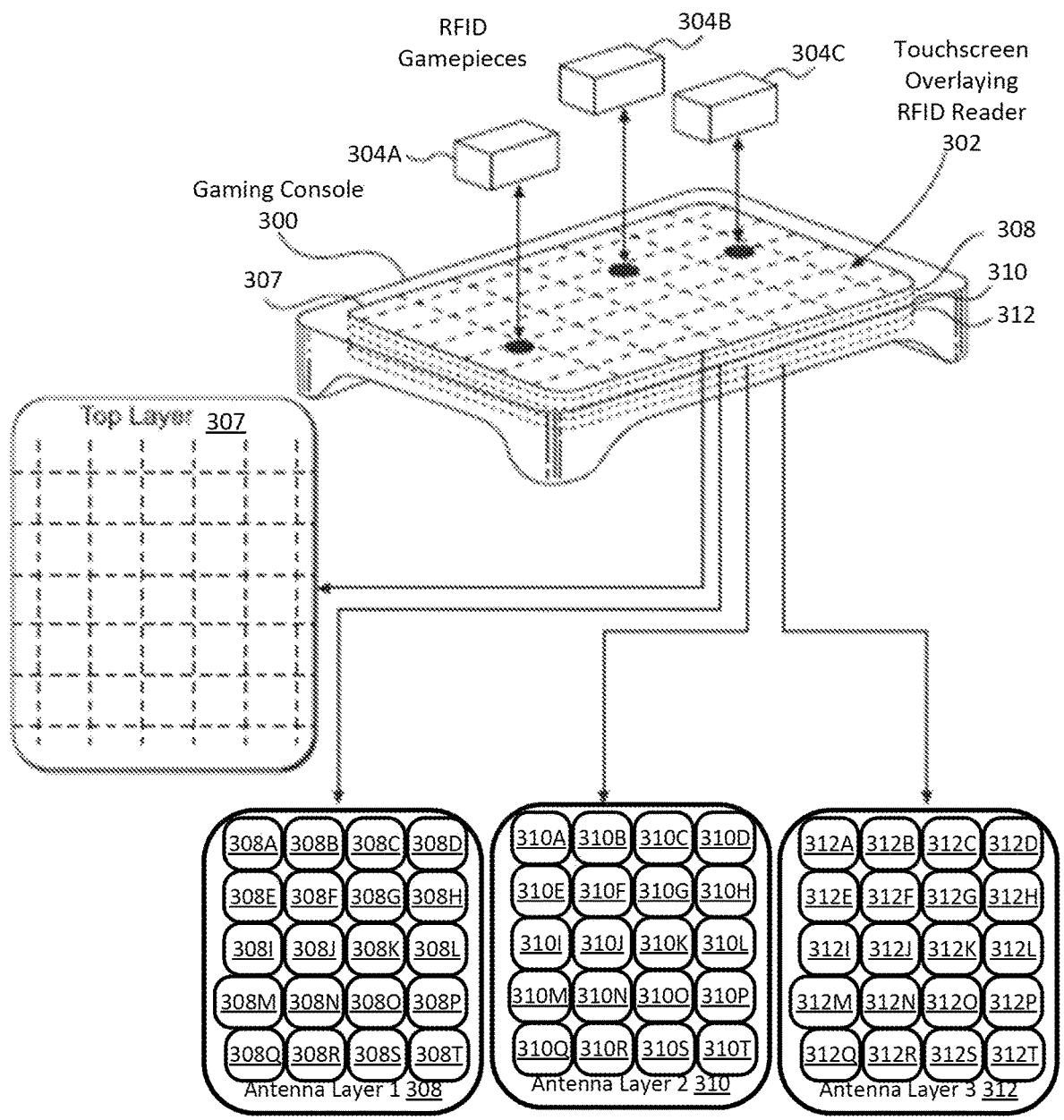
FIG. 3 illustrates an embodiment of a gaming console having an RFID reader consisting of multiple layers of antennas.

FIG. 3 illustrates an embodiment of a gaming console having an RFID reader consisting of multiple layers of antennas. As shown, gaming console 300 includes a touchscreen overlaying an RFID reader 302. The top layer 307 of the touchscreen is logically partitioned into zones. Here, the RFID reader consists of three layers, which together contain 60 RFID antennas. Antenna layer 1 308 includes 20 RFID antennas 308A-308T. Antenna layer 2 310 includes 20 RFID antennas 310A-310T. Antenna layer 3 312 includes 20 RFID antennas 312A-312T. The total number of RFID antennas need not equal the number of logical partitions of the top layer.

In operation according to some embodiments, the gaming console is configured to map each of touchscreen top layer zones to a nearby RFID antenna. In some such embodiments, the gaming console is configured to display a user interface on the top layer, and, when each of the RFID gamepieces 304A, 304B, and 304C is placed on a respective zone of the touchscreen, select an RFID antenna to map to the gamepiece and read the unique identifier out of the RFID gamepiece. The unique identifier is then passed to the processor for use in executing the game.

Figure 4A:
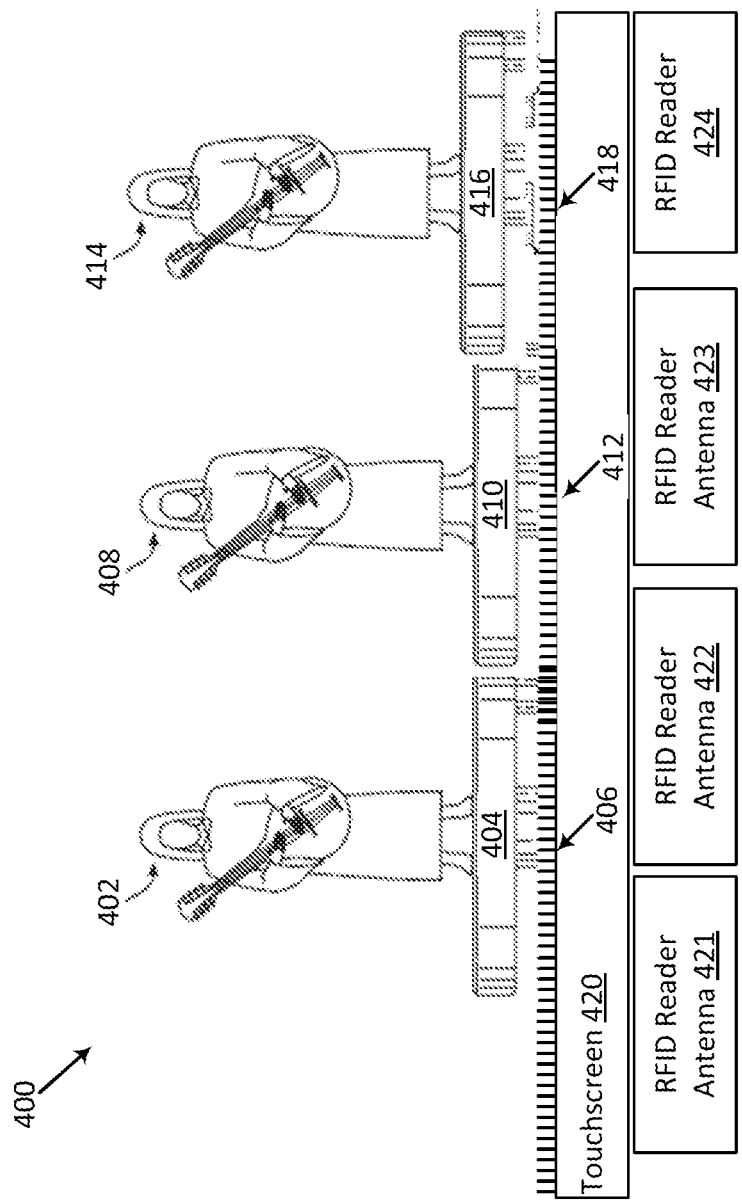
FIG. 4A illustrates multiple gamepieces positioned on a gaming console touchscreen, according to some embodiments.

FIG. 4A illustrates multiple gamepieces positioned on a gaming console touchscreen, according to some embodiments. As shown, three gamepieces have been placed on touchscreen 420 of gaming console 400. Gamepiece 402 has a base 404 placed at position 406 (e.g., an x-y coordinate of the touchscreen). Gamepiece 408 has a base 410 placed at position 412. Gamepiece 414 has a base 416 placed at position 418.

In operation according to some embodiments, the gaming console is configured to map each of the gamepieces to one of multiple RFID antennas 421, 422, 423. and 424. The gaming console is configured to then read the RFID tag in each of the gamepieces. and to use the information stored therein (i.e., a unique identifier) to conduct a game, for example as described with respect FIGS. 7A-7C.

Figure 4B:
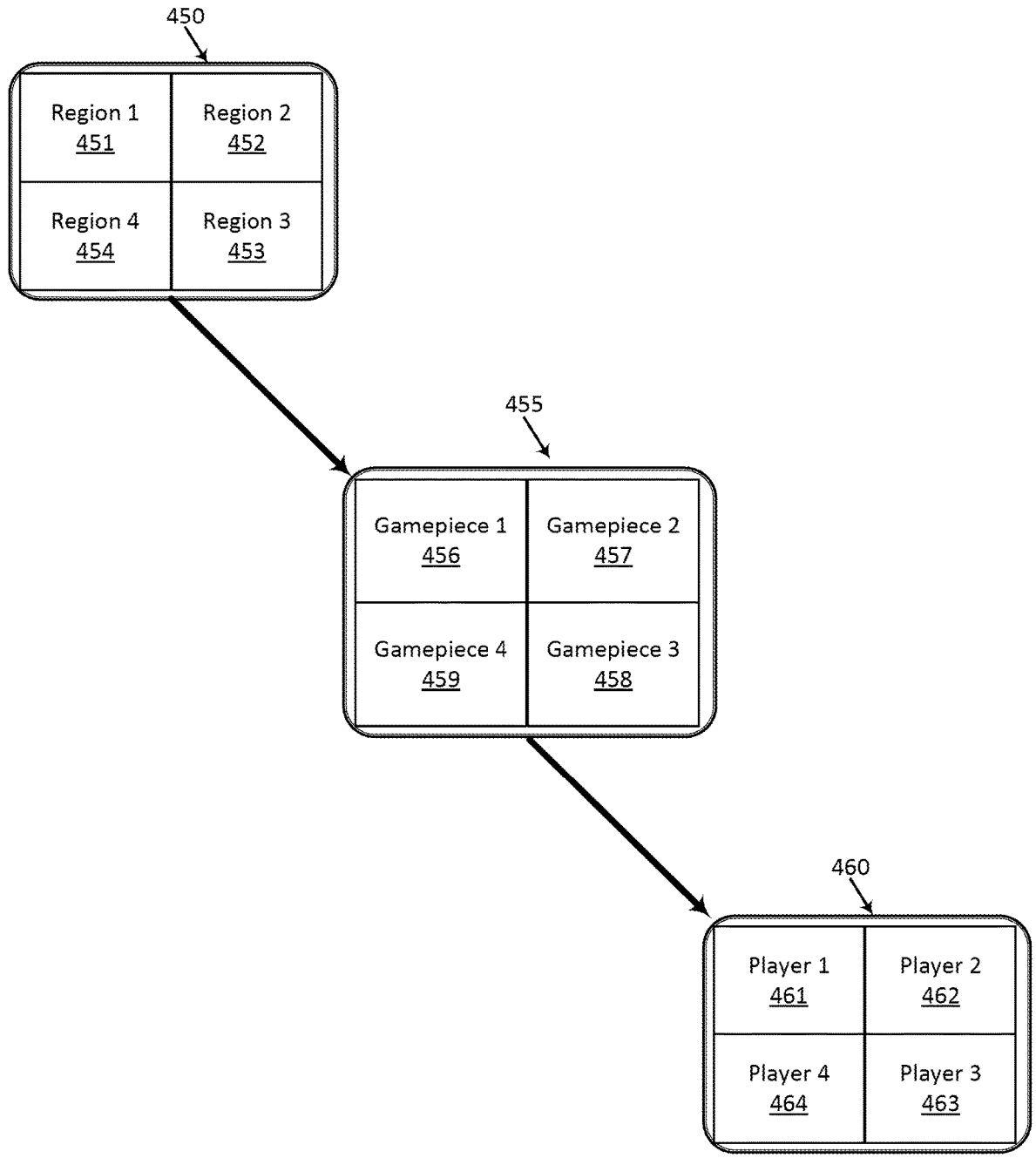
FIG. 4B illustrates determining seating based on touchscreen partitions, according to some embodiments.

FIG. 4B illustrates determining seating based on touchscreen partitions, according to some embodiments. As shown, touchscreen 450 of a gaming console has been logically partitioned into four partitions 451, 452, 453, and 454. In operation, four gamepieces are placed on touchscreen 455, which has been logically partitioned into four partitions 456, 457, 458, and 458, have been placed. After reading the RFID tags in each of the gamepieces (as described with respect to FIGS. 7A-7C), the gaming console determines the seating 460 of four players, 461, 462, 463, and 464, playing the game.

Figure 5:
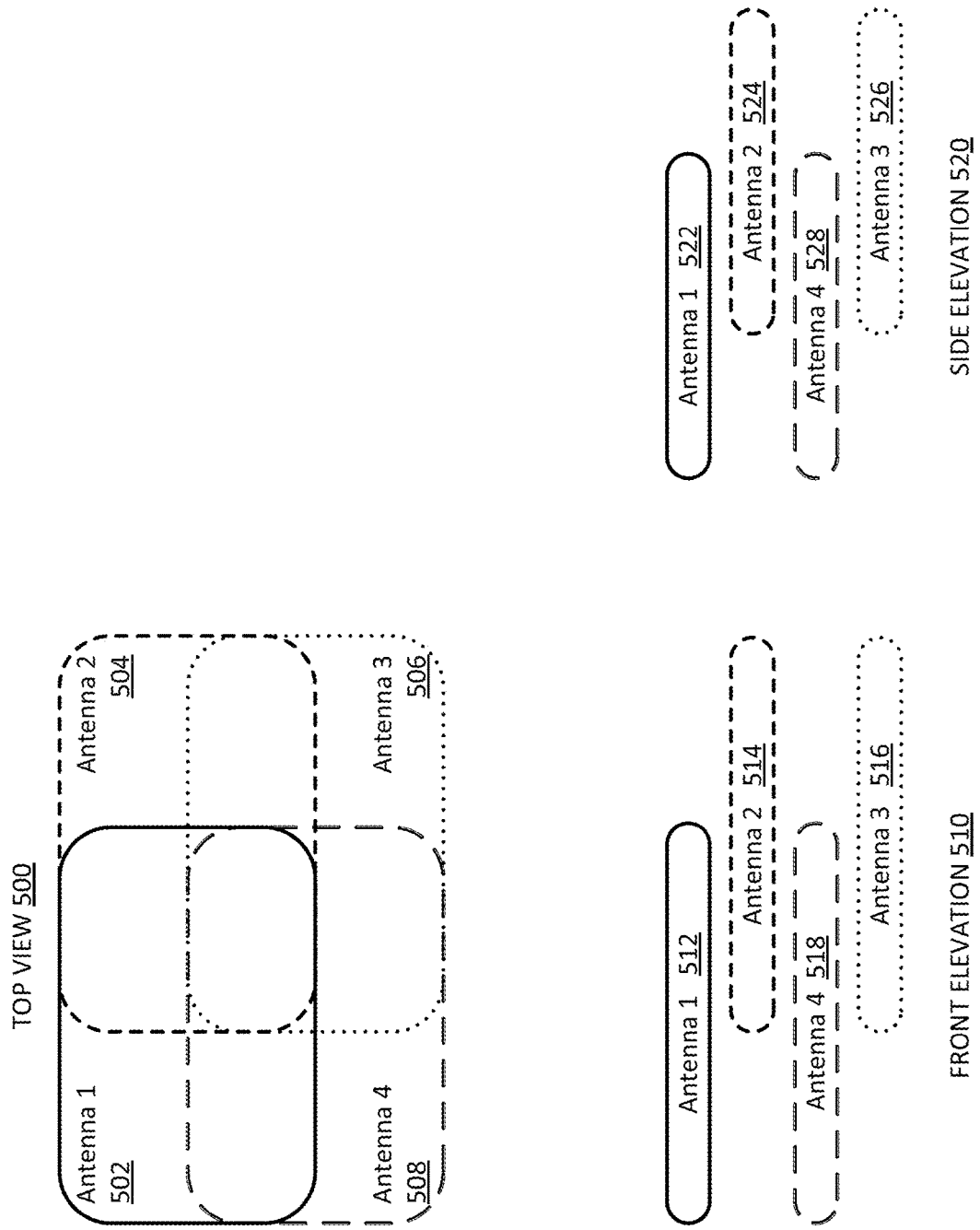
FIG. 5 illustrates top, front, and side views of a multilayer antenna for use as part of an RFID reader, according to some embodiments.

FIG. 5 illustrates top, front, and side views of a multilayer antenna for use as an RFID reader, according to some embodiments. As shown in top view 500, the RFID antenna includes antenna 1 502, antenna 2 504, antenna 3 506, and antenna 4 508. The four antennas are offset from each other as shown. FIG. 5 also shows front elevation 510, which shows frontal views of the four antennas stacked in offset layers as antenna 1 512, antenna 2 514, antenna 3 516, and antenna 4 518, FIG. 5 also shows side elevation 520, which shows side views of the four antennas stacked in offset layers as antenna 1 522, antenna 2 524, antenna 3 526, and antenna 4 528.

FIG. 6A illustrates a top view of a layer of antennas for use as an RFID reader, according to some embodiments. As shown, the top layer of three-dimensional RFID antenna 600 includes 20 antennas: antenna 1 602, antenna 5 604, antenna 9 606, antenna 13 608, antenna 17 610, antenna 21 612, antenna 25 614, antenna 29 616, antenna 33 618, antenna 37 620, antenna 41 622, antenna 45 624, antenna 49 626, antenna 53 628, antenna 57 630, antenna 61 632, antenna 65 634, antenna 69 636, antenna 73 638, and antenna 77 640. Not shown are the three equally sized RFID antenna layers underneath the top layer.

FIG. 6B illustrates a top view of an RFID reader with multiple gamepiece footprints thereon, according to an embodiment. Here, a top view of a gaming console includes a touchscreen 650 over an RFID reader with 12 RFID antennas. Also shown are the footprints of three gamepieces placed on the touchscreen. The footprint of gamepiece 1 655 includes touchpoint 656 of a central support and touchpoint 657 of a peripheral support separated by a predetermined distance 658. The footprint of gamepiece 2 660 includes touchpoint 661 of a central support and touchpoint 662 of a peripheral support separated by a predetermined distance 663. The footprint of gamepiece 3 665 includes touchpoint 666 of a central support and touchpoint 667 of a peripheral support separated by a predetermined distance 668. In the case of each gamepiece, the gaming console is configured to determine the position of the central support and of the peripheral support. and by determining an angle therebetween, to determine the orientation of the gamepiece.

Figure 7A:
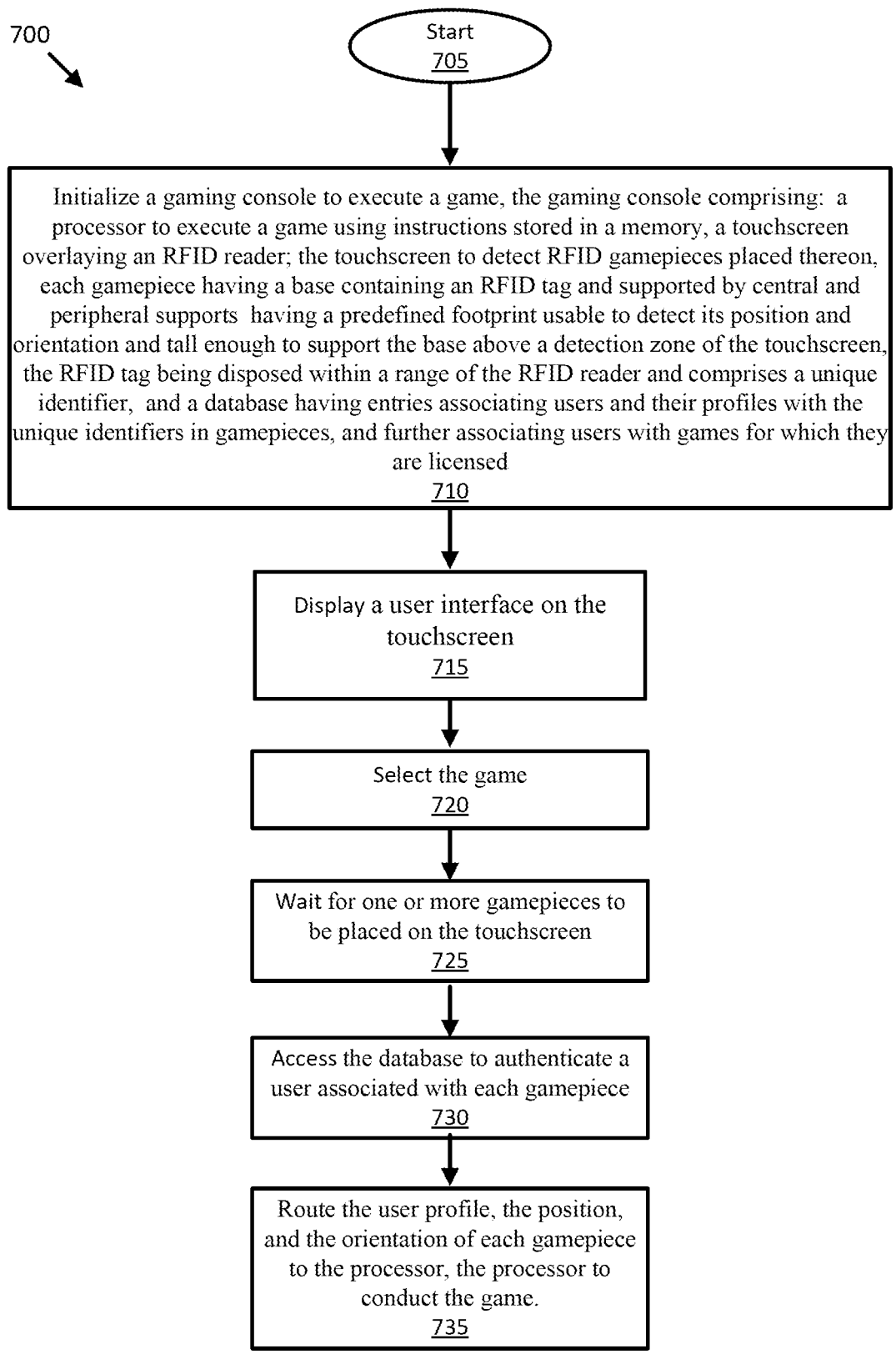
FIG. 7A illustrates a flow of executing a game using the disclosed gaming console, according to some embodiments.

FIG. 7A illustrates a flow of executing a game using the disclosed gaming console, according to some embodiments. As shown, flow 700 starts at operation 705. At operation 710, the method calls for initializing a gaming console to execute a game, the gaming console comprising: a processor to execute a game using instructions stored in a memory, a touchscreen overlaying an RFID reader; the touchscreen to detect RFID gamepieces placed thereon, each gamepiece having a base containing an RFID tag and supported by central and peripheral supports having a predefined footprint usable to detect its position and orientation and tall enough to support the base above a detection zone of the touchscreen, the RFID tag being disposed within a range of the RFID reader and comprises a unique identifier, and a database having entries associating users and their profiles with the unique identifiers in gamepieces, and further associating users with games for which they are licensed.

At operation 715, the gaming console is to display a user interface on the touchscreen.

At operation 720, the gaming console is to select the game. In some embodiments, the game can be selected via a user interface. In some embodiments, the game can be selected programmatically, or from a history of games played, or by default. In some embodiments, the gaming console is to identify users, access a database to identify games for which the users are licensed, and display one or more licensed games on the touchscreen to allow one to be selected.

At operation 725, the gaming console is to wait for one or more gamepieces to be placed on the touchscreen. Of course, the gaming console need not wait if the gamepieces were already placed. At operation 730, the gaming console is to access the database to authenticate a user associated with each gamepiece. At operation 735, the gaming console is to route the user profile, the position, and the orientation of each gamepiece to the processor, the processor to conduct the game.

Figure 7B:
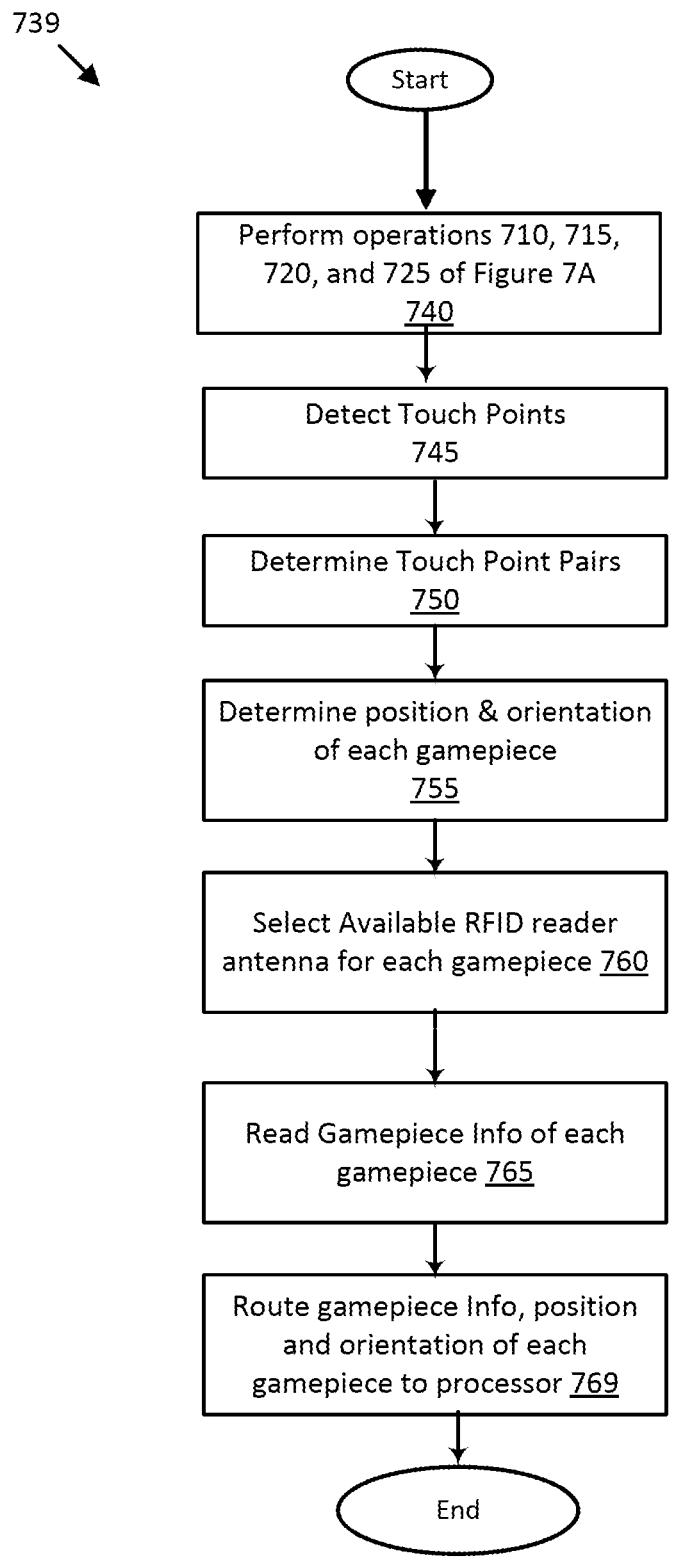
FIG. 7B illustrates a flow for reading information from multiple gamepieces and using the information to conduct a game, according to some embodiments.

FIG. 7B illustrates a flow for initializing a game by reading information from multiple gamepieces and using the information to conduct a game, according to some embodiments. As shown, a gaming console as described herein is to execute method 739. After starting, the gaming console at operation 740 is to perform operations 710, 715, 720, and 725 of FIG. 7A. At operation 745, the gaming console is to detect touch points (For example as shown in FIG. 6B). At operation 750, the gaming console is to determine touch point pairs. For example, the gaming console can resemble the gamepiece illustrated in FIG. 2C, with each pair consisting of a central touch point with a predetermined diameter and a peripheral touchpoint with a predetermined diameter, the touchpoints separated by a predetermined distance. At operation 755, the gaming console is to determine the position and orientation of each gamepiece. At operation 760, the gaming console is to select an available RFID reader antenna for each gamepiece. At operation 765, the gaming console is to read gamepiece Information of each gamepiece, for example to use a unique identifier from each gamepiece to access a database of users and services. At operation 769, the gaming console is to route gamepiece information, position, and orientation of each gamepiece to the processor. Initialization is then complete, and the gaming console can execute the game.

Figure 7C:
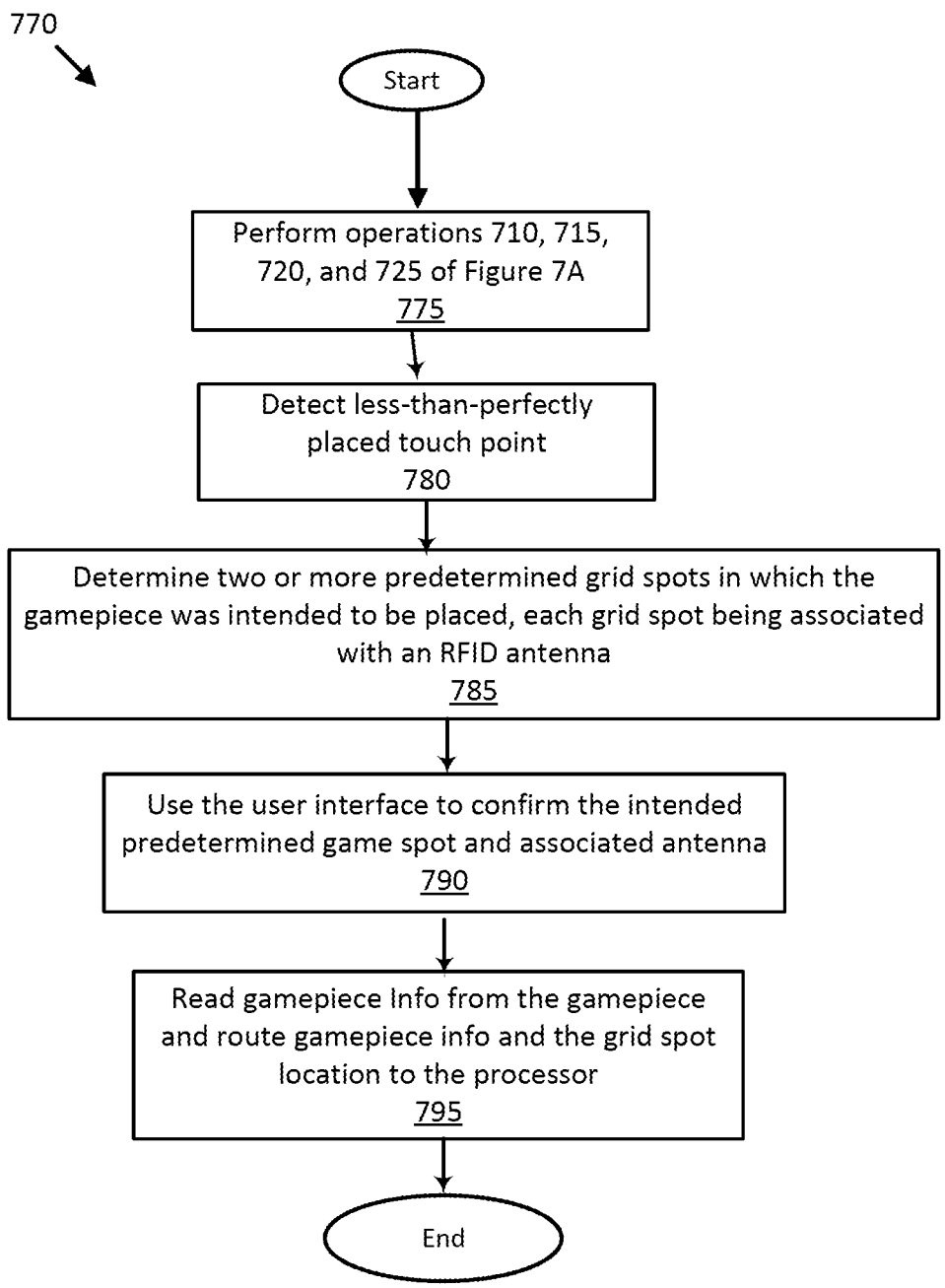
FIG. 7C illustrates a flow for reading information from a less-than-perfectly placed RFID gamepiece, according to some embodiments.

FIG. 7C illustrates an embodiment of a flow for reading information from a less-than-perfectly placed RFID gamepiece for example, as illustrated by FIG. 2D. To accommodate gamepieces potentially being placed between predetermined spots. In some such situations, the gaming console executes method 770. After starting, the gaming console at operation 775 is to perform operations 710, 715, 720, and 725 of FIG. 7A. At operation 780, the gaming console is to detect a less-than-perfectly placed touch point. At operation 785, the gaming console is to determine, based on the location of the touch point, two or more predetermined grid spots in which the gamepiece was intended to be placed, each grid spot being associated with an RFID antenna. At operation 790, the gaming console is to use the user interface and input from a user to confirm the intended predetermined game spot and associated antenna. At operation 795, the gaming console is to read gamepiece info from the gamepiece and route the gamepiece info and the grid spot location to the processor. The flow then ends.0

Figure 8:
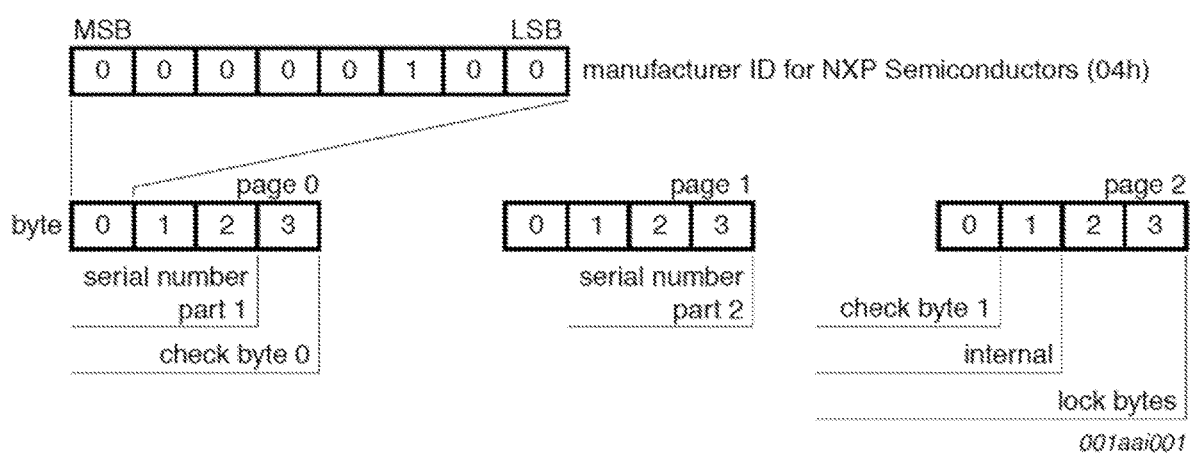
FIG. 8 illustrates an example format of a near-field communications (NFC) unique identifier (UID).

FIG. 8 illustrates an example format of an NFC unique identifier (UID). The UID is a unique, 7-byte value, that is contained in every NFC device (NFC tag). In some embodiments, the processor inside gaming console 100 reads the UID of each NFC device that has been placed on the touchscreen. That UID is used by the gaming console as a lookup into a database (either local or remote) to determine a user and a user profile associated with each gamepiece. If the gaming console fails to find the NFC device in the database, it may query a user of the gaming console 100 to retrieve that info. Such a query is beyond the scope of this disclosure.

FIG. 9 depicts a protocol stack of near-field communications (NFC) standards. As shown, NFC operations and modes that are applied by NFC devices and NFC antennas herein comply at the top level with ECMA 352, and ISO/IEC 21481, promulgated by ECMA International and the International Organization for Standardization/International Electrotechnical Commission, respectively.

Further Examples

The following examples describe various examples of configurations, methods, and embodiments of the disclosed invention, as described above.

Example 1 provides an exemplary gaming console comprising a processor to execute a game using instructions stored in a memory, a touchscreen to detect RFID gamepieces placed thereon and overlaying an RFID reader, each gamepiece having a base containing an RFID tag and supported by central and peripheral supports having a predefined footprint usable to detect its position and orientation and tall enough to support the base above a touchscreen detection zone, the RFID tag disposed within a range of the RFID reader and including a unique identifier, a database having entries associating users and their profiles with the unique identifiers in gamepieces, and further associating users with games for which they are licensed; and wherein the gaming console is configured to display a user interface on the touchscreen; select the game. wait for gamepieces to be placed on the touchscreen, detect, and read each gamepiece, access a database to authenticate a profile associated with each gamepiece, and use the profile, the position, and the orientation of each gamepiece to conduct the game.

Example 2 includes the substance of the exemplary gaming console of Example 1, wherein the predetermined footprint includes a central circular touch point having a first predetermined diameter, a peripheral circular touch point having a second, smaller predetermined diameter, and the central circular touch point having its center a predetermined distance away from a center of the peripheral circular touch point.

Example 3 includes the substance of the exemplary gaming console of Example 1, wherein each of the gamepieces enables its associated user to log in to the gaming console without requiring entry of login credentials on the user interface.

Example 4 includes the substance of the exemplary gaming console of Example 1, wherein each gamepiece is a passive RFID tag lacking a power source, and instead is supplied with energy via an electromagnetic field produced by the RFID reader.

Example 5 includes the substance of the exemplary gaming console of Example 1, wherein a first gamepiece is a non-player character (NPC) representing an artificial intelligence player, and a second gamepiece represents a macro to be executed after the gamepiece is placed on the touchscreen.

Example 6 includes the substance of the exemplary gaming console of Example 1, wherein the user interface provides a way to select the game.

Example 7 includes the substance of the exemplary gaming console of Example 1, further including a network interface, wherein the network interface is used to download the database from aa server.

Example 8 includes the substance of the exemplary gaming console of Example 1, further including a network interface, wherein the network interface is used to download instructions from a server and into the memory.

Example 9 includes the substance of the exemplary gaming console of Example 1, wherein the touchscreen is logically partitioned into a different region for each user.

Example 10 includes the substance of the exemplary gaming console of Example 1, wherein the gaming console displays a purchase interface for use by each user who needs to license the game.

Example 11 provides an exemplary method including initializing a gaming console to execute a game, the gaming console including: a processor to execute a game using instructions stored in a memory, a touchscreen overlaying an RFID reader; the touchscreen to detect RFID gamepieces placed thereon, each gamepiece having a base containing an RFID tag and supported by central and peripheral supports having a predefined footprint usable to detect its position and orientation and tall enough to support the base above a detection zone of the touchscreen, the RFID tag being disposed within a range of the RFID reader and includes a unique identifier, and a database having entries associating users and their profiles with the unique identifiers in gamepieces, and further associating users with games for which they are licensed, displaying a user interface on the touchscreen, selecting the game, waiting for one or more gamepieces to be placed on the touchscreen, accessing the database to authenticate a user associated with each gamepiece, and using the profile, the position, and the orientation of each gamepiece to conduct the game.

Example 12 includes the substance of the exemplary method of Example 11, wherein the predetermined footprint includes a central circular touch point having a first predetermined diameter, a peripheral circular touch point having a second, smaller predetermined diameter, and the central circular touch point having its center a predetermined distance away from a center of the peripheral circular touch point.

Example 13 includes the substance of the exemplary method of Example 11, wherein each of the gamepieces enables its associated user to log in to the gaming console without requiring entry of login credentials on the user interface.

Example 14 includes the substance of the exemplary method of Example 11, wherein each gamepiece is a passive RFID tag lacking a power source, and instead is supplied with energy via an electromagnetic field produced by the RFID reader.

Example 15 includes the substance of the exemplary method of Example 11, wherein a first gamepiece is a non-player character (NPC) representing an artificial intelligence player, and a second gamepiece represents a macro to be executed after the gamepiece is placed on the touchscreen.

Example 16 includes the substance of the exemplary method of Example 11, wherein the user interface provides a way to select the game.

Example 17 includes the substance of the exemplary method of Example 11, further including a network interface, wherein the network interface is used to download the database from aa server.

Example 18 includes the substance of the exemplary method of Example 11, further including a network interface, wherein the network interface is used to download instructions from a server and into the memory.

Example 19 includes the substance of the exemplary method of Example 11, wherein the touchscreen is logically partitioned into a different region for each user.

Example 20 includes the substance of the exemplary method of Example 11, wherein the gaming console displays a purchase interface to allow for each user who needs to license the game to purchase a license.

What is claimed is:

1. A gaming console for use with radio-frequency identification (RFID) gamepieces, comprising:
    a processor to execute a game using instructions stored in a memory;
    a touchscreen to detect RFID gamepieces placed thereon and overlaying an RFID reader, each gamepiece having a base containing an RFID tag and supported by central and peripheral supports having a predefined footprint usable to detect its position and orientation and tall enough to support the base above a touchscreen detection zone and below an RFID detection limit, the RFID tag disposed within a range of the RFID reader and comprising a unique identifier;
    a database having entries associating users and their profiles with the unique identifiers in gamepieces, and further associating users with games for which they are licensed; and
    wherein the gaming console is configured to display a user interface on the touchscreen, select the game, wait for gamepieces to be placed on the touchscreen, detect and read each gamepiece, access a database to authenticate a profile associated with each gamepiece, and use the profile, the position, and the orientation of each gamepiece to conduct the game.

2. The gaming console of claim 1, wherein the predefined footprint comprises a central circular touch point having a first predetermined diameter, a peripheral circular touch point having a second, smaller predetermined diameter, and the central circular touch point having its center a predetermined distance away from a center of the peripheral circular touch point.

3. The gaming console of claim 1, wherein each of the gamepieces enables its associated user to log in to the gaming console without requiring entry of login credentials on the user interface.

4. The gaming console of claim 1, wherein each gamepiece is a passive RFID tag lacking a power source, and instead is supplied with energy via an electromagnetic field produced by the RFID reader.

5. The gaming console of claim 1, wherein a first gamepiece is a non-player character (NPC) representing an artificial intelligence player, and a second gamepiece represents a macro to be executed after the second gamepiece is placed on the touchscreen.

6. The gaming console of claim 1, wherein the user interface provides a way to select the game.

7. The gaming console of claim 1, further comprising a network interface, wherein the network interface is used to download the database from a server.

8. The gaming console of claim 1, further comprising a network interface, wherein the network interface is used to download instructions from a server and into the memory.

9. The gaming console of claim 1, wherein the touchscreen is logically partitioned into a different region for each user.

10. The gaming console of claim 1, wherein the gaming console displays a purchase interface for use by each user who needs to license the game.

11. A method comprising:
    initializing a gaming console to execute a game, the gaming console comprising: a processor to execute the game using instructions stored in a memory, a touchscreen overlaying an RFID reader, the touchscreen being operable to detect RFID gamepieces placed thereon, each gamepiece having a base containing an RFID tag and being supported by central and peripheral supports having a predefined footprint usable to detect its position and orientation and tall enough to support the base above a detection zone of the touchscreen and below an RFID detection limit, the RFID tag being disposed within a range of the RFID reader and comprising a unique identifier, and a database having entries associating users and their profiles with the unique identifiers in gamepieces, and further associating users with games for which they are licensed;
    displaying a user interface on the touchscreen;
    selecting the game;
    waiting for one or more gamepieces to be placed on the touchscreen;
    accessing the database to authenticate a user associated with each gamepiece; and
    using the profile, the position, and the orientation of each gamepiece to conduct the game.

12. The method of claim 11, wherein the predefined footprint comprises a central circular touch point having a first predetermined diameter, a peripheral circular touch point having a second, smaller predetermined diameter, and the central circular touch point having its center a predetermined distance away from a center of the peripheral circular touch point.

13. The method of claim 11, wherein each of the gamepieces enables its associated user to log in to the gaming console without requiring entry of login credentials on the user interface.

14. The method of claim 11, wherein each gamepiece is a passive RFID tag lacking a power source, and instead is supplied with energy via an electromagnetic field produced by the RFID reader.

15. The method of claim 11, wherein a first gamepiece is a non-player character (NPC) representing an artificial intelligence player, and a second gamepiece represents a macro to be executed after the second gamepiece is placed on the touchscreen.

16. The method of claim 11, wherein the user interface provides a way to select the game.

17. The method of claim 11, further comprising a network interface, wherein the network interface is used to download the database from a server.

18. The method of claim 11, further comprising a network interface, wherein the network interface is used to download instructions from a server and into the memory.

19. The method of claim 11, wherein the touchscreen is logically partitioned into a different region for each user.

20. The method of claim 11, wherein the gaming console displays a purchase interface to allow for each user who needs to license the game to purchase a license.

* * * * *